US011907871B2

(12) United States Patent
Yamashita et al.

(10) Patent No.: US 11,907,871 B2
(45) Date of Patent: Feb. 20, 2024

(54) GENERATION DEVICE, GENERATION METHOD, AND RECORDING MEDIUM

(71) Applicant: Hitachi, Ltd., Tokyo (JP)

(72) Inventors: Yasuho Yamashita, Tokyo (JP); Takuma Shibahara, Tokyo (JP); Junichi Kuwata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 17/363,157

(22) Filed: Jun. 30, 2021

(65) Prior Publication Data

US 2022/0004584 A1 Jan. 6, 2022

(30) Foreign Application Priority Data

Jul. 3, 2020 (JP) ................. 2020-115828

(51) Int. Cl.
*G06F 16/248* (2019.01)
*G06F 16/26* (2019.01)
*G06F 18/213* (2023.01)
*G06Q 10/04* (2023.01)
*G06F 16/9032* (2019.01)
*G06F 16/9038* (2019.01)

(52) U.S. Cl.
CPC .......... *G06Q 10/04* (2013.01); *G06F 16/248* (2019.01); *G06F 16/26* (2019.01); *G06F 16/9038* (2019.01); *G06F 16/90328* (2019.01); *G06F 18/213* (2023.01)

(58) Field of Classification Search
CPC ............ G06F 16/2228; G06F 16/248; G06F 16/90328; G06F 16/9038; G06K 9/6224; G06K 9/6232; G06Q 10/04
See application file for complete search history.

(56) References Cited

U.S. PATENT DOCUMENTS

2006/0061572 A1\* 3/2006 Phelan ................. G06T 11/206 345/440
2013/0006915 A1 1/2013 Gunawardana et al.
2015/0269864 A1\* 9/2015 Tanabe .............. G09B 19/0076 434/236

FOREIGN PATENT DOCUMENTS

CN 110059131 A 7/2019

\* cited by examiner

*Primary Examiner* — Taelor Kim
(74) *Attorney, Agent, or Firm* — Mattingly & Malur, PC

(57) ABSTRACT

A generation device that generates a feature amount range visualization element that defines a continuous feature amount range for each of the factors based on time series data including feature amounts of different factors existing in time series and generates an inter-feature amount visualization element that defines relevance between a first feature amount of a first factor and a second feature amount of a second factor that are continuous in time. The device also generates visualization information indicating a relationship of the feature amounts related to the plurality of different factors by associating, by the inter-feature amount visualization element, a first feature amount range visualization element of the first factor with a second feature amount range visualization element of the second factor.

10 Claims, 11 Drawing Sheets

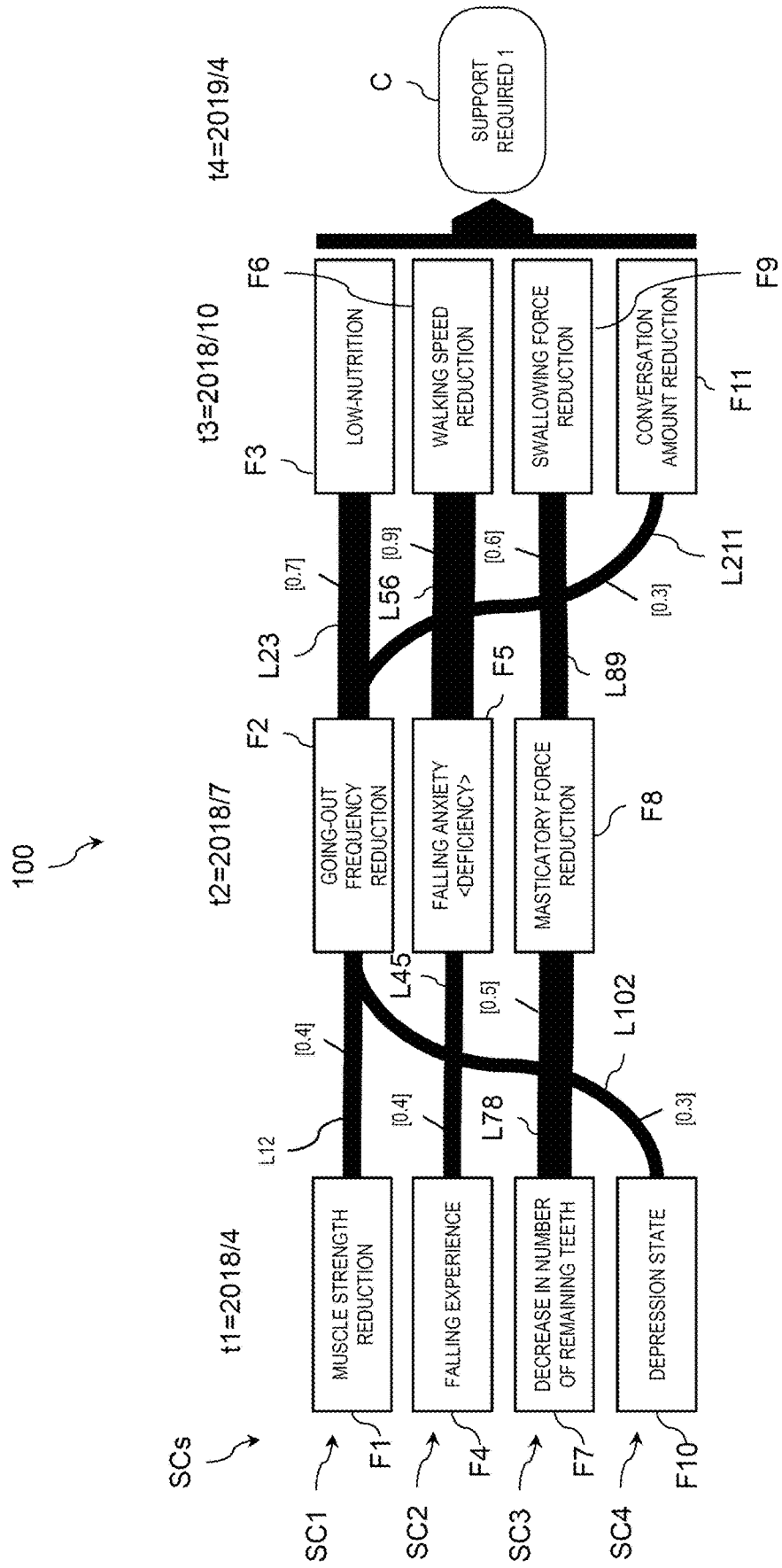

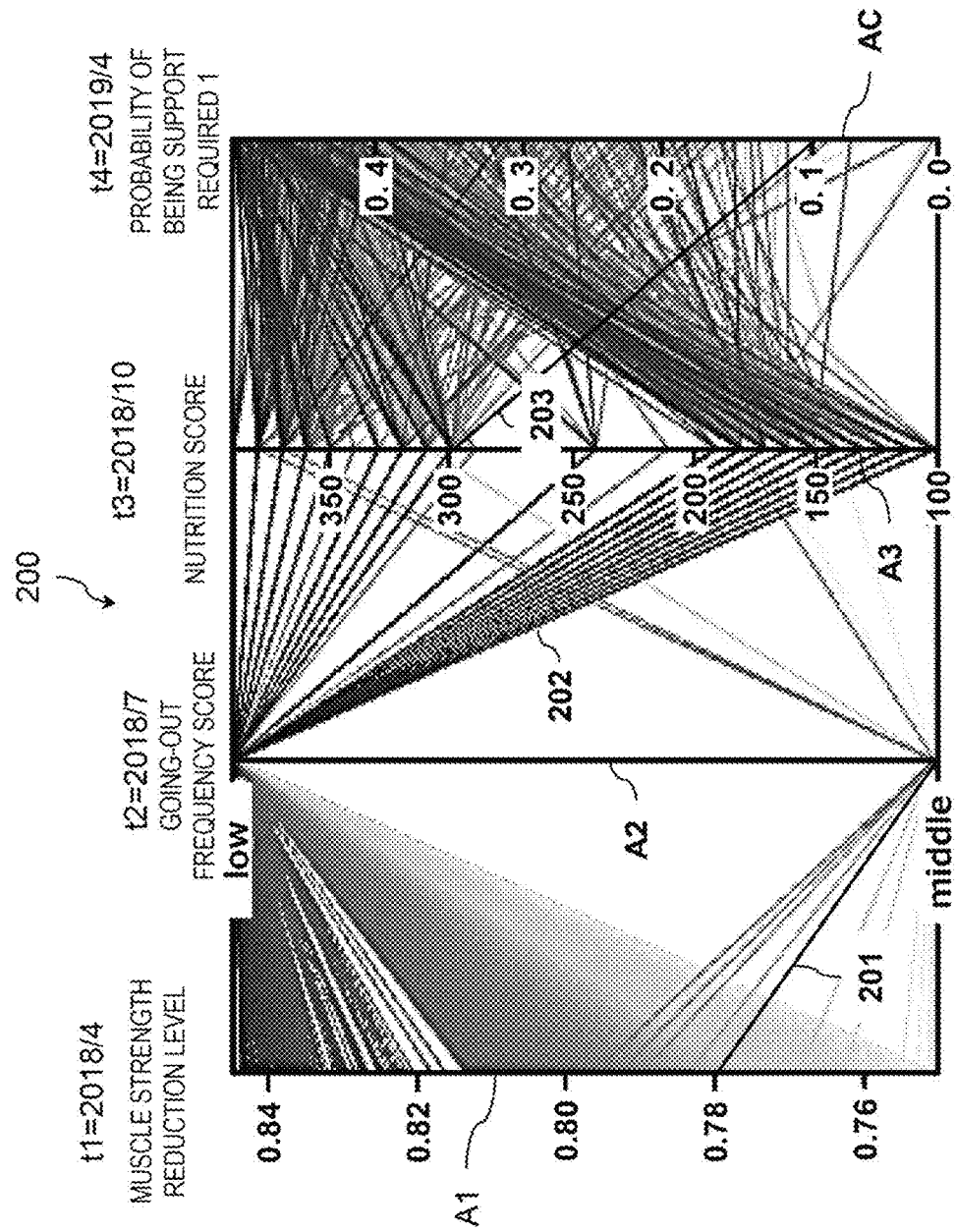

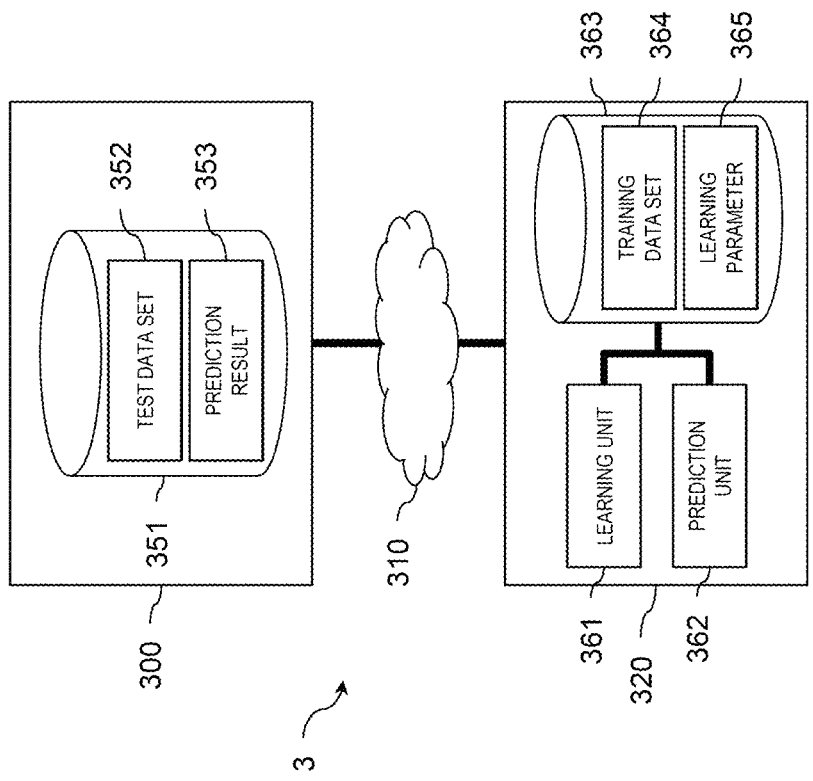
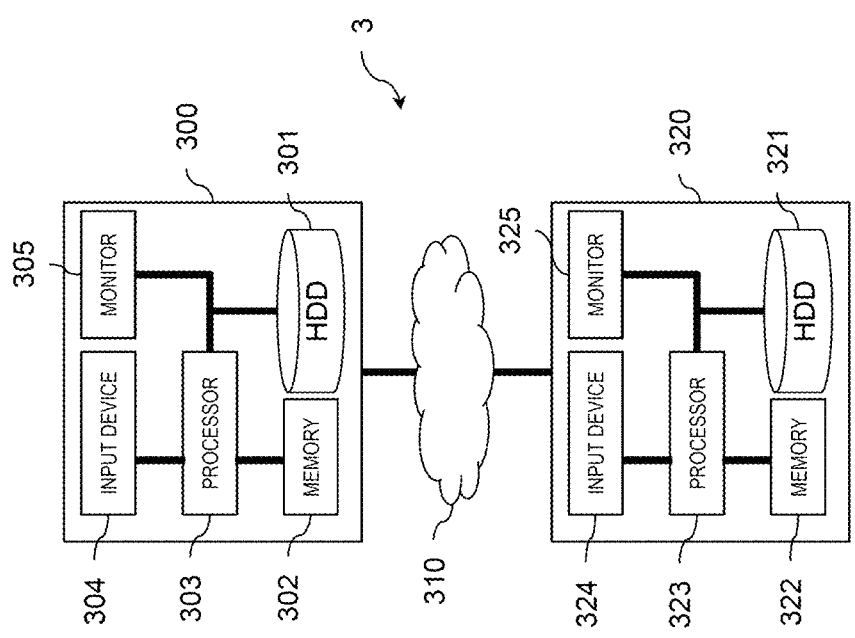

FIG. 5

RELEVANCE DEGREE TABLE 500

| FIRST FACTOR 501 | FIRST TIME POINT 502 | SECOND FACTOR 503 | SECOND TIME POINT 504 | RELEVANCE DEGREE 505 |
|---|---|---|---|---|
| F1 | 2019-12-06 | F1 | 2019-11-06 | 0.1 |
| F1 | 2019-12-06 | F2 | 2019-11-06 | 0.2 |
| F1 | 2019-12-06 | F3 | 2019-11-06 | 0.4 |
| ... | ... | ... | ... | ... |
| F1 | 2019-12-06 | Fx | 2019-11-06 | 0.4 |
| F2 | 2019-12-06 | F1 | 2019-11-06 | 0.3 |
| F2 | 2019-12-06 | F2 | 2019-11-06 | 0.3 |
| ... | ... | ... | ... | ... |

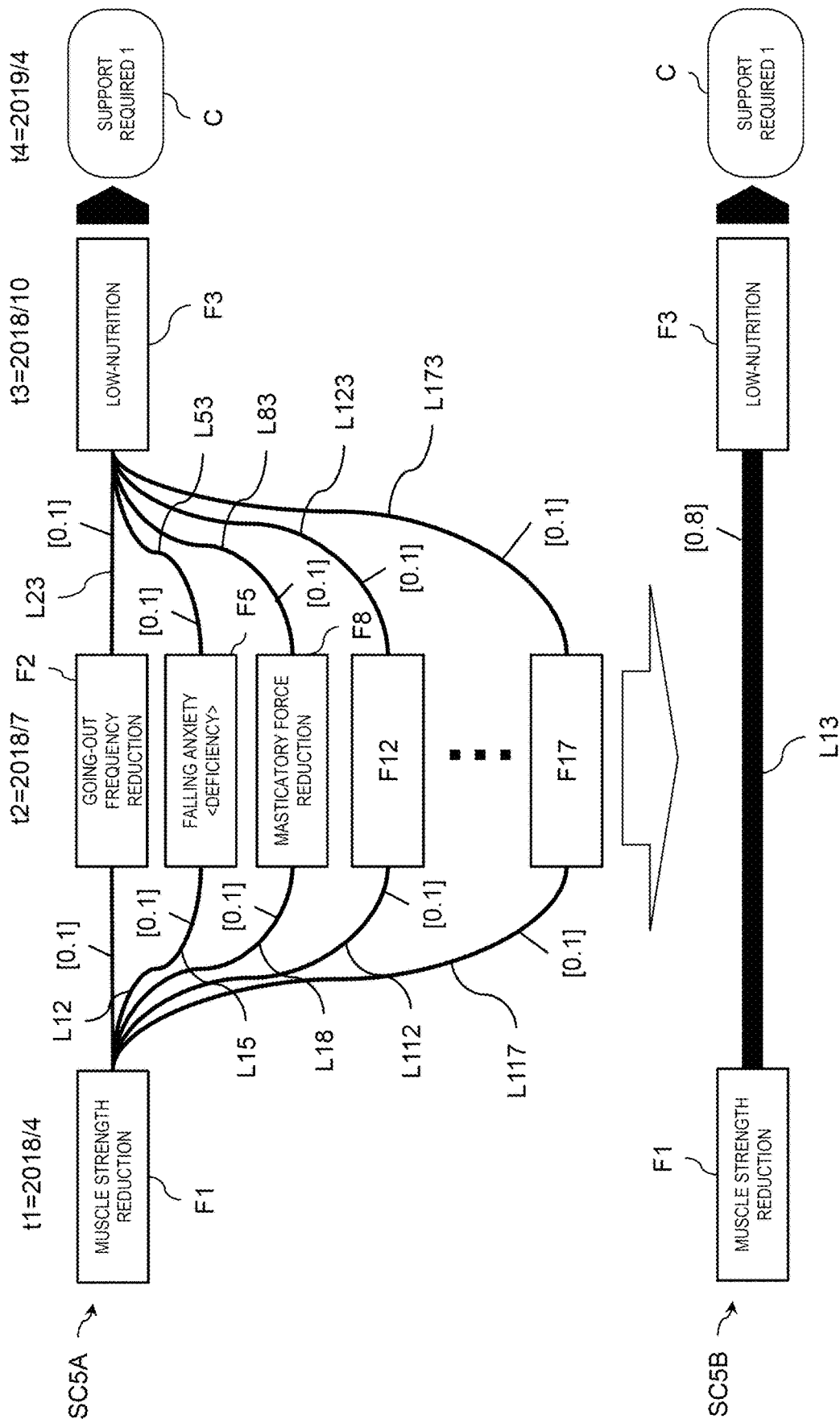

GENERATION DEVICE, GENERATION METHOD, AND RECORDING MEDIUM

CLAIM OF PRIORITY

The present application claims priority from Japanese patent application JP 2020-115828 filed on Jul. 3, 2020, the content of which is hereby incorporated by reference into this application.

BACKGROUND OF THE INVENTION

1. Field of the Invention

The present invention relates to a generation device, a generation method, and a recording medium storing a generation program for generating data.

2. Description of the Related Art

A purpose of time series data analysis is to find and model a relationship among feature amounts at each time point from time series data in which a value of a feature amount set at each time point is described, perform future prediction using a model, and further analyze the model to understand the relationship among the feature amounts at each time point.

A use of the time series data analysis is diverse, such as predicting a future health condition of people based on time series medical data, predicting a future market value of a financial product based on time series market data, or predicting how a state of cells changes based on time series biochemical data.

For example, when a model for predicting whether a patient will recover in the future is created based on the time series medical data, it is required not only to create a prediction model to perform the future prediction, but also to clarify a scenario leading to recovery of a patient and generate a process graph visualizing the scenario.

The scenario is a process indicating in what order and how a plurality of feature amounts interact with each other to contribute to patient recovery or non-recovery, and at which time point and what value each feature amount affects the patient recovery at that time.

The following US Patent Application Publication NO. 2013/0006915 (PTL 1) discloses a method of generating a decision graph based on event stream data. In the method, the event stream data includes a plurality of events. Each event includes a related time stamp, and includes generating a decision node of a graph. Each decision node includes a question having a temporal element. In addition, in the method, leaf nodes of a graph each including a rate parameter are generated. The nodes of the graph are repeatedly divided and merged in order to maximize a measurement value of result purity of the nodes generated as a result.

The following Chinese Patent Application Publication NO. 110059131 (PTL 2) discloses, as a method of generating a process graph leading to future prediction from a model obtained based on time series data, a method of graphing a relationship among feature amounts at each time point and time evolution thereof.

In the method in PTL 1, the number of branches needs to be limited to a finite number in order to express the scenario by a decision graph including a finite number of nodes. For this purpose, it is required to discretize a question set for each node by setting some threshold value for the feature amount. It is necessary to introduce some assumption for the discretization. The discretization may simplify information of data originally held as a continuous value. Therefore, if possible, it is desirable to handle the feature amount with the continuous value as it is.

The graph according to the method in PTL 2 expresses the scenario by how the relationship among the feature amounts at each time changes with time, but does not directly express how the feature amounts are related among different time points. For example, although only having a small influence degree at the beginning, a factor as beginning of a large bad circulation cycle may be missed when the process is traced. The graph does not express information on a value of the feature amount by which the future prediction is affected.

SUMMARY OF THE INVENTION

The invention has been made in view of the above circumstances, and an object of the invention is to present a relationship among factors at different time points using continuous feature amounts.

A generation device according to one aspect of the invention disclosed in the present application includes: a processor configured to execute a program; and a storage device that stores the program. The processor is configured to execute visualization element generation processing of generating, based on time series data including feature amounts of a plurality of different factors existing in time series, a feature amount range visualization element that defines a feature amount range that is a continuous range of the feature amount for each of the factors, and generating an inter-feature amount visualization element that defines relevance between a first feature amount of a first factor and a second feature amount of a second factor that are continuous in time among the plurality of different factors, and visualization information generation processing of generating visualization information indicating a relationship of the feature amounts related to the plurality of different factors by associating, by the inter-feature amount visualization element, a first feature amount range visualization element of the first factor with a second feature amount range visualization element of the second factor among the feature amount range visualization element for each of the factors generated by the visualization element generation processing.

According to a representative embodiment of the invention, a relationship among factors at different time points can be presented using continuous feature amounts. Problems, configurations and effects other than those described above will be clarified by the description of following embodiments.

BRIEF DESCRIPTION OF THE DRAWINGS

FIG. 1 is a process graph illustrating a scenario representing a relationship among factors at different time points according to a first embodiment.

FIG. 2 is a line graph showing a relationship among feature amounts of the factors in the scenario according to the first embodiment.

FIGS. 3A and 3B are block diagrams showing a system configuration example of a generation system.

FIG. 5 is an explanatory diagram showing an example of a relevance degree table generated by the generation device.

FIG. 11 is an explanatory diagram showing an example of shortening the process graph.

DESCRIPTION OF THE PREFERRED EMBODIMENTS

First Embodiment

Figure 4:
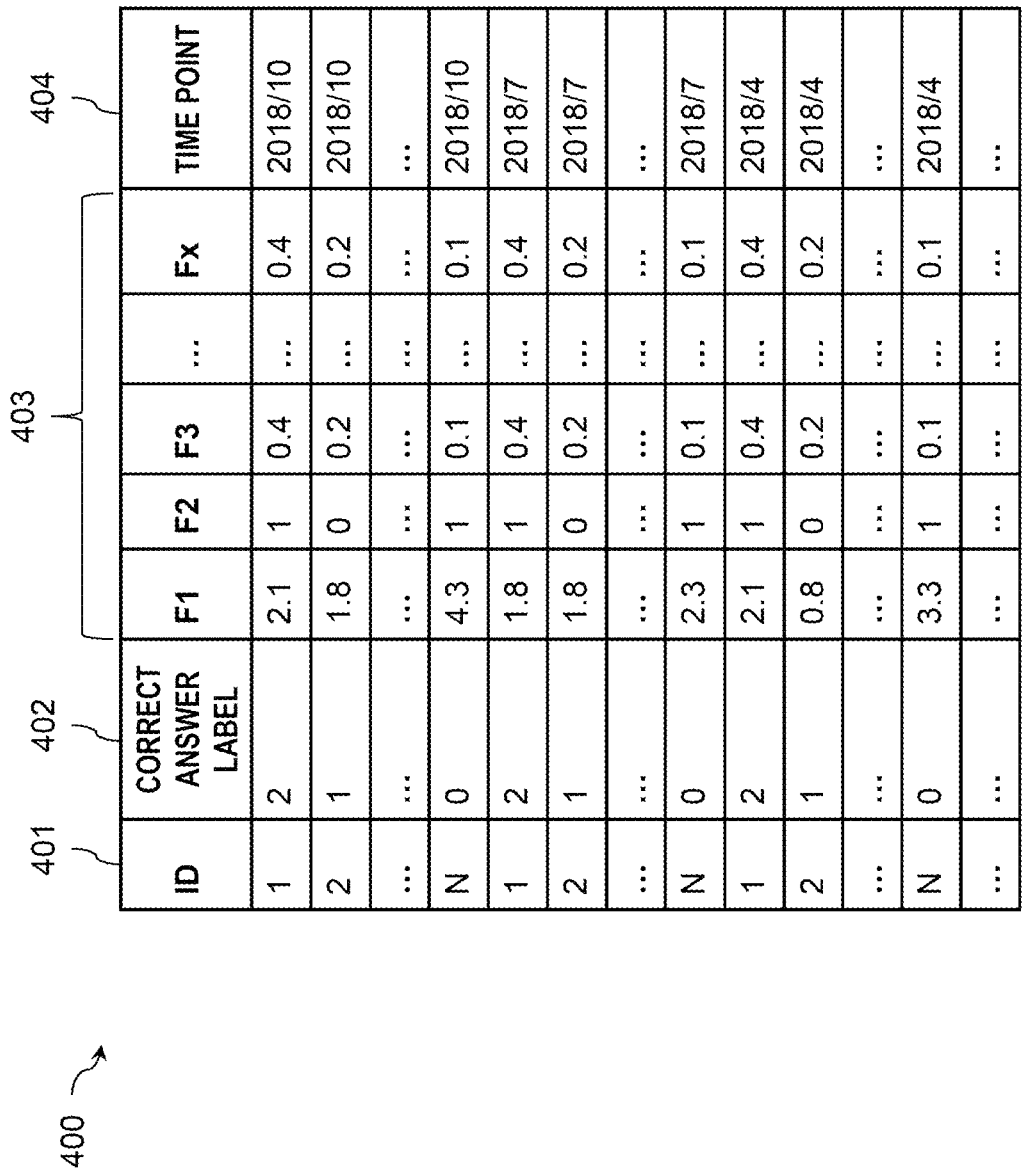
FIG. 4 is an explanatory diagram showing an example of time series data input to a generation device.

In a first embodiment, a generation device will be described as an example in which a prediction model of predicting whether care is required in year 2019 using healthcare service data in year 2018 for an elderly person in a local government is created, and a process graph leading to prediction is generated based on the prediction model. The graph output by the generation device enables the local government to grasp through what scenario the elderly person requires or does not require care, and serves as a great clue to take measures to prevent the care from being required. This leads to improvement in quality of healthcare service of the local government, reduction in medical care and healthcare cost of the country, and enhancement in health of people.

<Process Graph>

FIG. 1 is a process graph illustrating a scenario representing a relationship among factors at different time points according to a first embodiment. A process graph 100 is one piece of visualization information generated by the generation device, and includes one or more scenarios (in FIG. 1, as an example, four scenarios SC1 to SC4, and simply referred to as a scenario SC when the four scenarios SC1 to SC4 are not distinguished from one another) and a correct answer label C when following the scenario SC. A factor F (a collective term for F1 to F11, and the like) is an element that causes a result (correct answer label C) that occurs in a subject.

The scenario SC is expressed as graphic data in which rectangular graphics indicating a plurality of factors F at different time points are connected by black line link L (a collective term for L12, L23, and the like) indicating a relevance degree. Such graphic data is referred to as a factor visualization element. The visualization element is graphic data that can be visually recognized by a user by being drawn on a screen or a color of a drawn region. Rectangular graphic data indicating the factor F is arranged in time series from a left end (oldest) to a right end (latest) in FIG. 1. The link L indicates the relevance degree between the factors F at both ends by a thickness thereof. That is, the thickness of the link L increases as a relevance degree value increases. The link L indicating magnitude of the relevance degree is referred to as a relevance degree visualization element.

For example, a scenario SC1 is graphic data in which factors F1 (muscle strength reduction) to F3 (low-nutrition) are arranged in a time series order. A link L12 connects the factor F1 and the factor F2 (going-out frequency reduction), and the relevance degree thereof is 0.4. A link L23 connects the factor F2 and the factor F3, and the relevance degree thereof is 0.7.

Similarly, a scenario SC2 is graphic data in which factors F4 (falling experience) to F6 (walking speed reduction) are arranged in the time series order. A link L45 connects the factor F4 and the factor F5 (falling anxiety <deficiency>), and the relevance degree thereof is 0.4. A link L56 connects the factor F5 and the factor F6, and the relevance degree thereof is 0.9.

Similarly, a scenario SC3 is graphic data in which factors F7 (decrease in the number of remaining teeth) to F9 (swallowing force reduction) are arranged in the time series order. A link L78 connects the factor F7 and a factor F8 (masticatory force reduction), and the relevance degree thereof is 0.5. A link L89 connects the factor F8 and the factor F9, and the relevance degree thereof is 0.6.

Similarly, a scenario SC4 is graphic data in which factors F10 (depression state), F2, and F11 (conversation amount reduction) are arranged in the time series order. A link L102 connects the factor F10 and the factor F2, and the relevance degree thereof is 0.3. A link L211 connects the factor F2 and the factor F11, and the relevance degree thereof is 0.3. In FIG. 1, the magnitude of the relevance degree is represented by the thickness of the link L. However, the magnitude of the relevance degree may be represented by a color of the link L (for example, a shade of the color) instead of the thickness.

The correct answer label C indicates a corresponding result when the scenario SC is traced. In FIG. 1, "support required 1" is shown as an example. For example, according to Article 7, Paragraph 2 of the Care Insurance Law, a support required state refers to a state in which it is expected that, due to physical or mental disabilities, it is necessary to provide assistance in particular to prevention or deterioration of a state in which the care is always required for all or a part of basic operations in daily life such as bathing, excretion, meal, and the like over a period specified by the Ordinance of the Ministry of Health, Labor and Welfare, or it is expected that there will be an obstacle to continuous daily life for the period specified by the Ordinance of the Ministry of Health, Labor and Welfare due to physical or mental disabilities.

The "support required 1" corresponds to a support required state, and is a state in which the basic operation in daily life can be performed almost by himself/herself, but social support is required for activities required for living such as households. A "support required 2" corresponds to a support required state, and is a state in which some support is required more than the support required 1 due to anxiety about a physical motion such as standing up and walking. A state of being able to live without social support is referred to as "independence". Therefore, although there are three types of values in the correct answer label C, the scenarios SC1 to SC4 in which the correct answer label is the "support required 1" are shown here.

The graphic data indicating the correct answer label C is referred to as a result visualization element. The generation device may delete or hide the link L indicating the relevance degree equal to or less than a predetermined threshold value (for example, 0.3).

<Line Graph>

FIG. 2 is a line graph showing the relationship among the feature amounts of the factors F in the scenario SC according to the first embodiment. A line graph 200 is one piece of visualization information representing the relationship among the feature amounts of the factors F in any one of the scenarios SC selected from the process graph 100. FIG. 2 shows, as an example, the line graph 200 representing the relationship among the feature amounts of the factors F in the scenario SC1.

The line graph 200 is the line graph 200 in which vertical axes A1 to V3 and VC (simply referred to as a vertical axis A when the vertical axes A1 to A3 and AC are not distinguished from one another) at time points t1 to t4 (t1<t2<t3<t4) indicating a range (value range) of the feature amounts related to the factors F1 to F3 and the correct answer label C of the scenario SC1 are arranged in the time series order of the factors F1 (muscle strength reduction) to F3 (low-nutrition) (the vertical axis AC is at the right end).

The vertical axis A1 is an axis indicating a range of a "muscle strength reduction level" which is a feature amount related to the factor F1 (muscle strength reduction) at the time point t1 (=April 2018). The vertical axis A2 is an axis indicating a range of a "going-out frequency score" which is a feature amount related to the factor F2 (going-out frequency reduction) at the time point t2 (=July 2018). The vertical axis A3 is an axis indicating a range of a "nutrition score" which is a feature amount related to the factor F3 (low-nutrition) at the time point t3 (=October 2018). The vertical axis AC is an axis indicating a range of probability of being the support required 1 which is a correct answer label at the time point t4 (=April 2019).

A numerical axis that defines a feature amount range, which is a continuous range (value range) of the feature amount for each factor F, such as the vertical axes A1 to A3, is referred to as a feature amount range visualization element. A numerical axis that defines a prediction value range, which is a continuous range (value range) of prediction value (probability of being the support required 1), such as the vertical axis AC, is referred to as a prediction value range visualization element. The continuous range is a range (value range) in which values of lowest digits of the feature amount are continuous.

Line segments are displayed between adjacent vertical axes A. The line segment may be a straight line or a curved line. Each line segment connects the vertical axis A (here, "Aa") of one of the adjacent factors F (here, Fa) and the vertical axis A (here, "Ab") of the other factor F (here, "Fb") subsequent to the one factor Fa. One of both ends of the line segment indicates the feature amount of the factor Fa on the vertical axis Aa, and the other of the both ends indicates the feature amount of the factor Fb on the vertical axis Ab. For example, a line segment 201 shows a muscle strength reduction level of 0.78 at a time point t1 and a going-out frequency score of "middle" at a time point t2 of a certain subject. A line segment 202 shows the going-out frequency score of "low" at the time point t2 and the nutrition score of "100" at a time point t3 of the certain subject. A line segment 203 shows the nutrition score of "300" at the time point t3 and the probability of being the support required 1 of "0.1" at a time point t4 of the certain subject.

A line segment defining the relevance between the feature amount of the factor Fa and the feature amount of the factor Fb that are continuous in time, such as the line segments 201 and 202, is referred to as an inter-feature amount visualization element. A line segment defining the relevance between the feature amount of the factor Fc (for example, the factor F3) appearing after the factor Fb and the probability of being the support required 1, such as the line segment 203, is referred to as an inter-feature amount prediction value visualization element.

<System Configuration Example>

FIGS. 3A and 3B are block diagrams showing a system configuration example of a generation system. In FIGS. 3A and 3B, a server-client type generation system 3 is described as an example, whereas the generation system may be a stand-alone type. FIG. 3A is a block diagram showing a hardware configuration example of the generation system 3, and FIG. 3B is a block diagram showing a functional configuration example of the generation system 3. In FIGS. 3A and 3B, the same components are designated by the same reference numerals.

The generation system 3 is configured such that a client terminal 300 and a generation device 320, which is a server, are communicably connected to each other via a network 310.

In FIG. 3A, the client terminal 300 includes a hard disk drive (HDD) 301 which is an auxiliary storage device, a memory 302 which is a main storage device, a processor 303, an input device 304 which is a keyboard or a mouse, and a monitor 305. The generation device 320 includes an HDD 321 which is an auxiliary storage device, a memory 322 which is a main storage device, a processor 323, an input device 324 which is a keyboard or a mouse, and a monitor 325. The main storage device, the auxiliary storage device, and the portable storage medium (not shown) are collectively referred to as a storage device. The storage device stores a neural network 900 and learning parameters 365, which will be described later with reference to FIG. 9.

In FIG. 3B, the client terminal 300 includes a client database (DB) 351. The client DB 351 is implemented as a storage device such as the HDD 301 or the memory 302. The client DB 351 stores a test data set 352 and a prediction result 353. The test data set 352 is a set of test data. The prediction result 353 is data obtained from a prediction unit 362 via the network 310. In the case of the server-client type, there are one or more client terminals 300.

The generation device 320 includes a learning unit 361, the prediction unit 362, and a server database (DB) 363. The learning unit 361 is a functional unit that outputs the learning parameters 365 using the neural network 900.

The prediction unit 362 is a functional unit that constructs the neural network 900 using the learning parameters 365, executes prediction processing by providing the test data to the neural network 900, and outputs the prediction result 353 to the client terminal 300. The learning unit 361 and the prediction unit 362 implement functions by causing the processor 323 to execute programs stored in a storage device such as the HDD 321 or the memory 322.

The server DB 363 stores a training data set 364 and the learning parameters 365. The server DB 363 is implemented as a storage device such as the HDD 321 or the memory 322. A plurality of generation devices 320 may be provided. For example, a plurality of generation devices 320 may be provided for load distribution. The generation device 320 may be configured into a plurality of generation devices 320 for each function.

<Time Series Data>

FIG. 4 is an explanatory diagram showing an example of time series data input to the generation device 320. The time series data 400 is stored in the storage device as the training data set 364 or the test data set 352. The time series data 400 includes, for example, an ID 401, a correct answer label 402, a factor group 403, and a time point 404 as fields. An entry that is a combination of values of each field on the same row is referred to as a sample.

The ID 401 is identification information for uniquely specifying a subject. If the values of the ID 401 are the same, the subjects are the same subjects. Even if the values of the ID 401 are the same, if entries (rows) are different, different samples of the same subject are obtained.

The correct answer label 402 is any value of multiple values, and indicates a correct answer of the sample. For example, in a case of a subject group in which the ID 401 is a target of whether the subject is in the support required state, the correct answer label C=0, which is the value of the correct answer label 402 in each sample, indicates "independence", C=1 indicates "support required 1", and C=2 indicates "support required 2".

The factor group 403 is a set of two or more factors F1, F2, F3, and Fx (x is an integer of 1 or more). Values of the factors F1, F2, F3, ..., Fx of each sample indicate the feature amounts of the factors F1, F2, F3, ..., Fx.

The time point 404 indicates one point or a time interval on a time axis at which the sample is obtained. A unit of the time point 404 may be any of year, month, week, day, hour, minute, and second. In FIG. 4, as an example, the time point 404 is set on in unit of month (day or unit smaller than day is omitted) such as "2018/10". The time series data 400 in FIG. 4 indicates results of three examinations at the time points 404 of "2018/4", "2018/7", and "2018/10" for the subject group in which the values of the ID 401 is 1 to N (N is an integer equal to or greater than 1).

<Relevance Degree Table>

FIG. 5 is an explanatory diagram showing an example of the relevance degree table generated by the generation device 320. The relevance degree table 500 is intermediate data generated by inputting the time series data 400 to the generation device 320, and indicates the relevance degree among the same or different factors F at different time points 404. The relevance degree table 500 is stored in the storage device.

The relevance degree table 500 includes, for example, a first factor 501, a first time point 502, a second factor 503, a second time point 504, and a relevance degree 505 as fields. An entry that is a combination of values of each field on the same row corresponds to, for example, the link L and the factors F at both ends of the link L shown in FIG. 1.

The first factor 501 is a factor F in the factor group 403. The first time point 502 is a time point 404 at which the feature amount of the first factor 501 is acquired. The second factor 503 is a factor F in the factor group 403. The second factor 503 may be the same factor F as or different from the first factor 501.

The second time point 504 is a time point 404 at which the feature amount of the second factor 503 is acquired. The second time point 504 is a time point 404 different from the first time point 502. A combination of the first factor 501 and the second factor 503 is selected by the generation device 320, for example, in a round-robin manner.

The relevance degree 505 is an index value indicating a degree of the relevance (strength of co-occurrence) between the first factor 501 and the second factor 503. In the example, the larger the value of the relevance degree 505 is, the higher the relevance is, and the thicker the link L is. The relevance degree 505 is calculated by the generation device 320.

<Connection Type Table Group>

Figure 6:
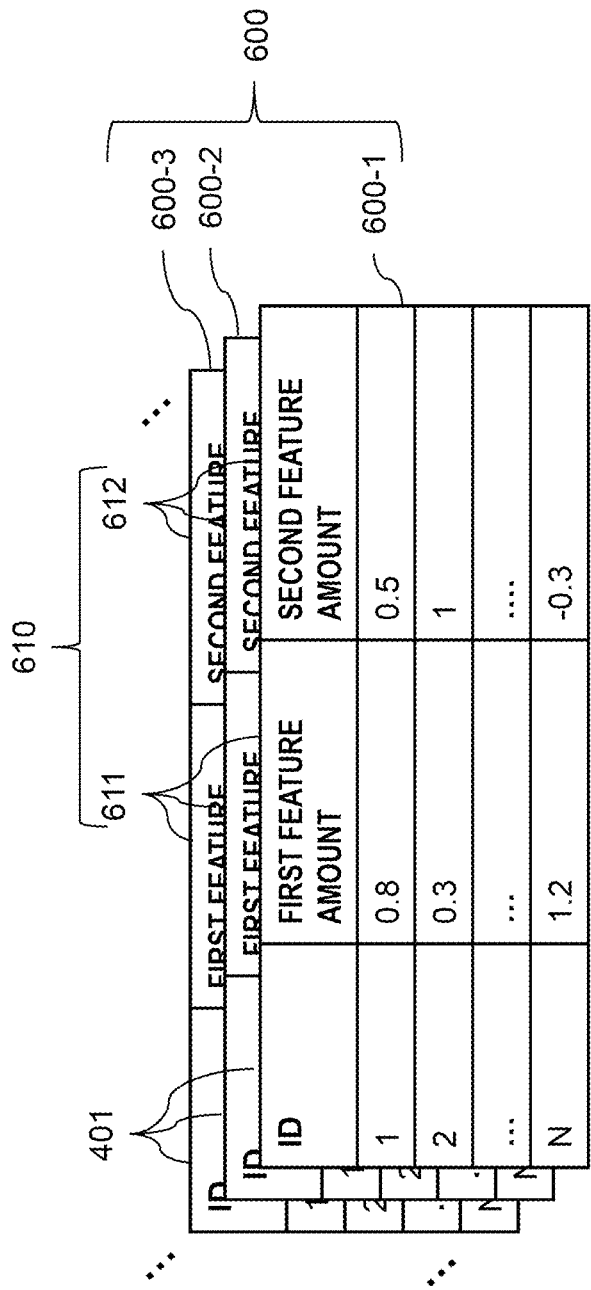
FIG. 6 is an explanatory diagram showing an example of a connection type table group generated by the generation device.

FIG. 6 is an explanatory diagram showing an example of a connection type table group generated by the generation device 320. A connection type table group 600 is a set of a plurality of connection type tables 601-1, 601-2, 601-3, and the like (simply referred to as a connection type table 601 when the tables are not distinguished from one another).

The connection type table 601 is a table for storing connection types. The connection type table 601 stores the ID 401 and a connection type 610. The connection type 610 is a combination of a feature amount (hereinafter, referred to as a first feature amount) 611 of the factor Fa and a feature amount (hereinafter, referred to as a second feature amount) 612 of the factor Fb for each ID 401.

The combination of the factor Fa and the factor Fb is different for each connection type table. The connection type 610 corresponds to a line segment between the vertical axes A shown in FIG. 2. The connection type table 601 is generated based on the time series data 400 by the generation device 320.

<Detailed Functional Configuration Example of Generation Device 320>

Figure 7:
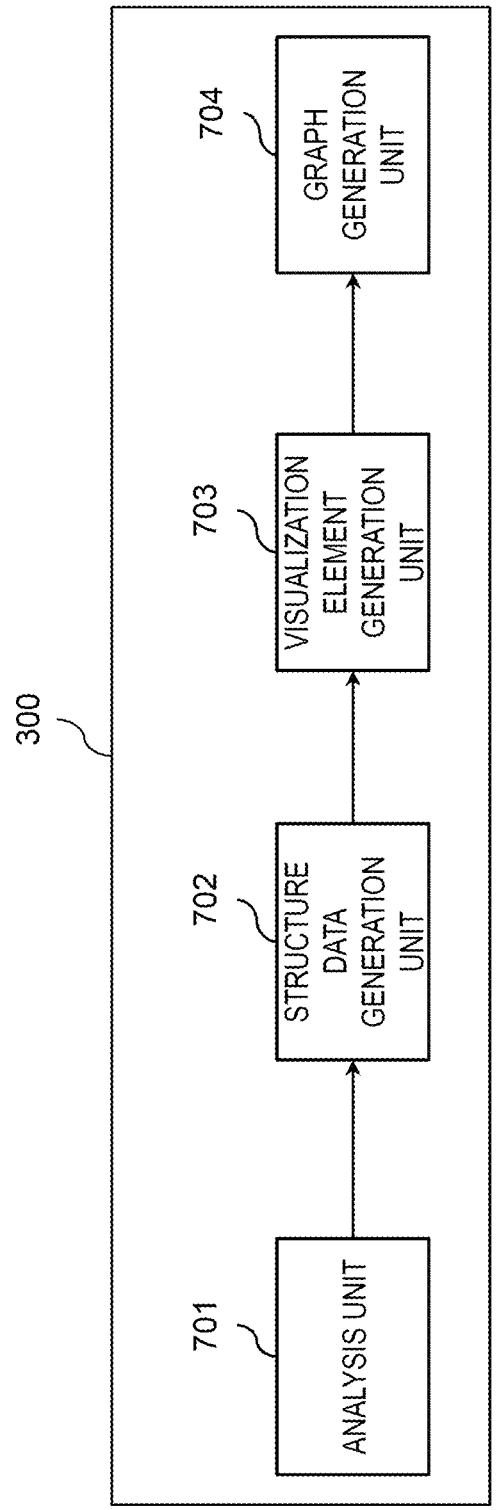
FIG. 7 is a block diagram showing a detailed functional configuration example of the generation device.

FIG. 7 is a block diagram showing a detailed functional configuration example of the generation device 320. The generation device 320 includes an analysis unit 701, a structure data generation unit 702, a visualization element generation unit 703, and a graph generation unit 704. Specifically, the analysis unit 701, the structure data generation unit 702, the visualization element generation unit 703, and the graph generation unit 704 are implemented, for example, by causing the processor 323 to execute generation programs stored in a storage device such as the memory 322 shown in FIGS. 3A and 3B.

The analysis unit 701 analyzes the relevance of factors in the time series data 400. Specifically, for example, the analysis unit 701 generates the relevance degree table 500 and the connection type table group 600 based on the time series data 400. The analysis unit 701 includes the learning unit 361 and the prediction unit 362 shown in FIG. 3B.

Specifically, for example, the analysis unit 701 generates, by the learning unit 361, a prediction model by inputting the time series data 400 that is the training data set 364. The analysis unit 701 generates the relevance degree table 500 and the connection type table group 600 while inputting the time series data 400 that is the training data set 364 to the prediction model and outputting the prediction result by the prediction unit 362.

The structure data generation unit 702 generates structure data based on an analysis result of the analysis unit 701. Specifically, for example, the structure data generation unit 702 converts a sample group of the relevance degree table 500 into first structure data, and converts a plurality of connection types included in the connection type table group 600 into second structure data. Details of the first structure data and the second structure data will be described later.

The visualization element generation unit 703 generates a process graph visualization element constituting the process graph 100 shown in FIG. 1 based on the first structure data converted by the structure data generation unit 702, and generates a line graph visualization element constituting the line graph 200 shown in FIG. 2 based on the second structure data converted by the structure data generation unit 702.

The process graph visualization element includes graphic data (including an acquisition time point and a name of the factor F) of each factor F for each of the time points t1 to t3 in the process graph 100, a link L (including the relevance degree) between the graphic data of the factor F, and graphic data (including the name of the correct answer label "support required 1") of the correct answer label C (support required 1).

The line graph visualization element includes a vertical axis A (including a hard facing of the vertical axis A, a name of the feature amount of the factor F, and an acquisition time point t of the feature amount) in the line graph 200, and line segments 201, 202, 203, and the like between the vertical axes A.

The graph generation unit 704 generates the process graph 100 using the process graph visualization element generated by the visualization element generation unit 703, generates the line graph 200 for each scenario SC using the line graph visualization element generated by the visualization element generation unit 703, and stores the process graph 100 and the line graph 200 in the storage device. The graph generation unit 704 associates the scenario SC in the process graph 100 with the line graph 200.

Accordingly, when the user operates the input devices 304 and 324 to select a certain scenario SC from the process graph 100, the generation device 320 reads the line graph 200 associated with the selected scenario SC from the storage device, displays the line graph 200 on the monitor 325, and transmits the line graph 200 to the client terminal 300 via the network 310 in a displayable manner.

Accordingly, in the analysis of the time series data 400, the generation device 320 can generate the process graph 100 and the line graph 200 representing the scenario SC leading to the predicted future while handling the value of the feature amount of the factor F as a continuous value.

<Graph Generation Processing Procedure>

Figure 8:
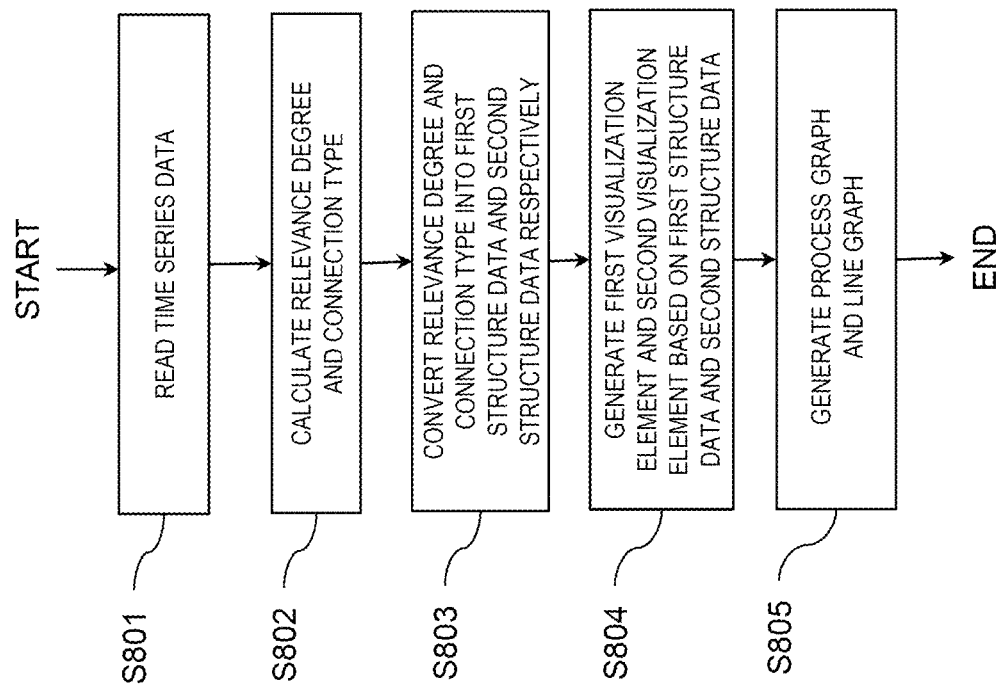
FIG. 8 is a flowchart showing an example of a graph generation processing procedure performed by the generation device.

FIG. 8 is a flowchart showing an example of a graph generation processing procedure performed by the generation device 320. The generation device 320 reads the time series data 400 as the training data set 364 from the storage device (step S801). The time series data 400 is data constituting the sample by a combination $\{x_{(n)(t)}, y_{(n)}\}$ of a time series feature amount vector $x_{(n)(t)}$ indicating a feature amount of the factor F and an objective variable $Y_{(n)}$ disclosing a correct answer label C which is a future value to be predicted.

$n=\{1, \ldots, N\}$ is an index for specifying the subject, and is assumed to be, for example, N=30,000. Further, $t=\{1, \ldots, T\}$ is an index representing the time point. For example, T is assumed to be 3, and time points t=1 (t1 in FIGS. 1 and 2), 2 (t2 in FIGS. 1 and 2), and 3 (t3 in FIGS. 1 and 2) indicate April 2018, July 2018, and October 2018, respectively.

A feature amount vector $x_{(n)(t)} \in R^D$ is a D-dimensional actual numerical vector (D≥1), and includes, for example, body information such as muscle strength and a nutritional state of a subject n, medical information such as medicine and medical history, and information such as the going-out frequency and the conversation amount.

The objective variable $Y_{(n)}$ takes a class value of any one of the correct answer labels C=0, 1, and 2. In this case, for the subject group that is not certified as requiring care at the time point t1=April 2018, $Y_{(n)}=0$ means that the subject n is not certified as any of care requirement degrees of the "support required 1" and the "support required 2" at the time point t4=April 2019. $Y_{(n)}=1$ means that the subject n is certified as the care requirement degree of the "support required 1" at the time point t4. $Y_{(n)}=2$ means that the subject n is certified as the care requirement degree of the "support required 2" at the time point t4. That is, the objective variable $Y_{(n)}$ indicates how the care requirement degree of the subject n changes in one year from the time point t1 to the time point t4.

Next, the generation device 320 calculates, by the analysis unit 701, the relevance degree and the connection type (step S802). Specifically, for example, the analysis unit 701 uses the feature amount vector $x_{(n)(t)}$ to generate a prediction model by deep learning show below, and inputs the feature amount vector $x_{(n)(t)}$ as the test data set 352 to the generated prediction model, thereby outputting probability $p_{(n)}$ of being the objective variable $Y_{(n)}=1$ (support required 1).

The prediction model is a prediction model in which white box property is enhanced in a deep learning model which is originally a black box. Here, a structure example of a neural network used by the analysis unit 701 (the learning unit 361 and the prediction unit 362) and a generation example of the prediction model will be described.

[Structure Example of Neural Network]

Figure 9:
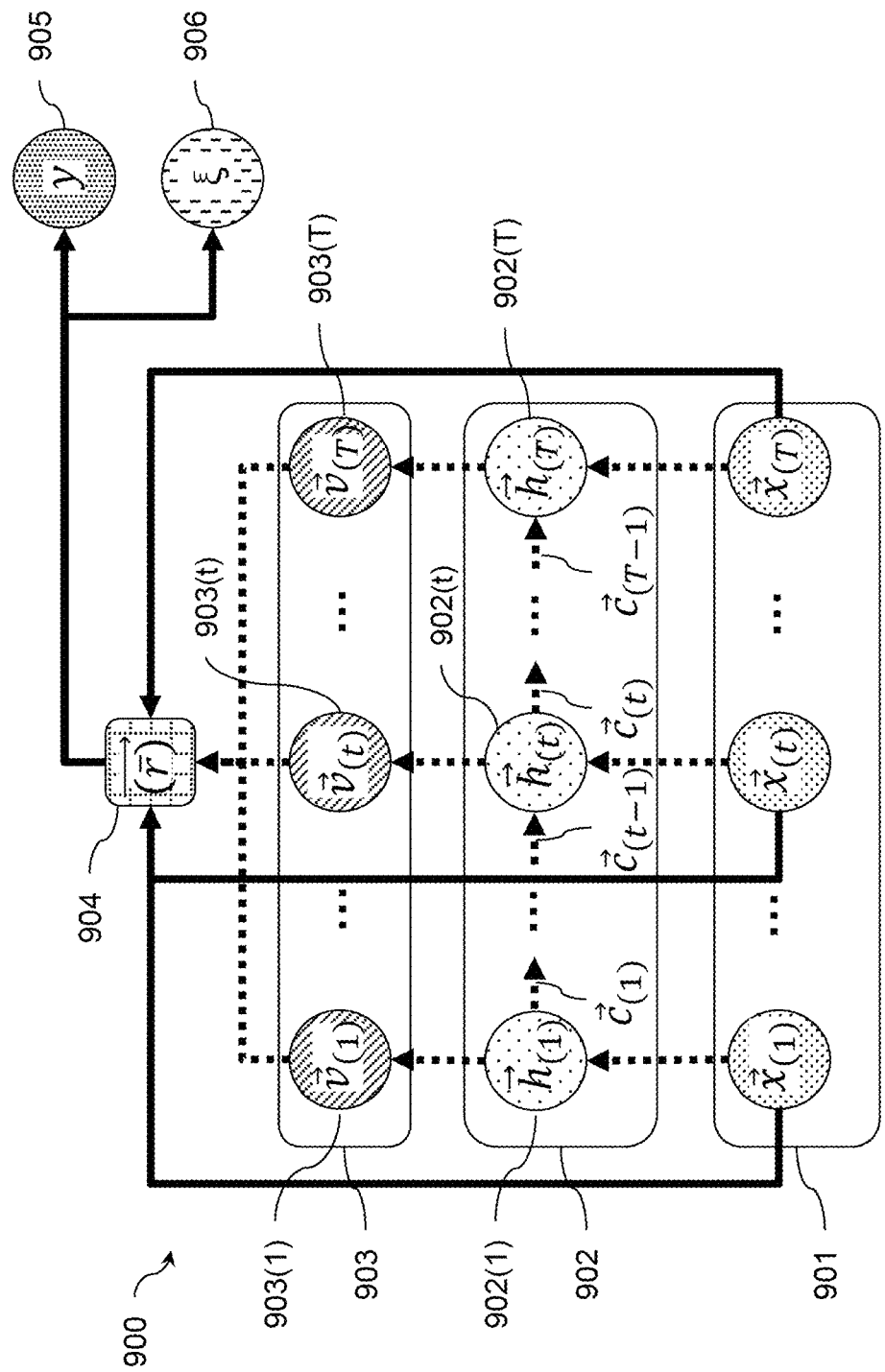
FIG. 9 is an explanatory diagram showing a structure example of a neural network according to the first embodiment.

FIG. 9 is an explanatory diagram showing a structure example of the neural network according to the first embodiment. In the following, in order to simplify the description, an index (n) for specifying the sample may be omitted. The neural network 900 includes a time series data oriented neuron group 902, a transform unit group 903, a reallocation unit 904, a decision unit 905, and an importance unit 906. A set of feature amount vectors $x_{(1)}$ to $x_{(T)}$ that serve as input data is shown as an input unit 901.

The time series data oriented neuron group 902 is a set of T time series data oriented neurons 902(1) to 902(T). During learning performed by the learning unit 361, a time series data oriented neuron 902(t) accepts input of the feature amount vector $x_{(t)}$ as the training data set 364. Then, the time series data oriented neuron 902(t) calculates, as shown in the following Formula (1), an internal vector $h_{(t)}$ and an internal state parameter $c_{(t)}$ based on the feature amount vector $x_{(t)}$ and an internal state parameter $c_{(t-1)}$.

$$\vec{h}_{(t)}, \vec{c}_{(t)} = RNN(\vec{x}_{(t)}, \vec{c}_{(t-1)}) \tag{1}$$

provided that, $\vec{h}_{(t)}$ is an internal vector $h_{(t)} \in R^{D'}$, $\vec{c}_{(t)}$ is an internal parameter $c_{(t)} \in R^{D''}$ An RNN function on the right side is a function that recursively inputs the feature amount aggregated from feature amount vectors $x_{(0)}$ to $x_{(t-1)}$ input to a time series data oriented neuron 902(t-1) before the acquisition time point (t-1) together with the feature amount vector $x_{(t)}$, and calculates the internal vector $h_{(t)}$ and the internal state parameter $c_{(t)}$. The RNN function holds a learning parameter RWs serving as a weight.

The learning parameters RWs are a set of learning parameters RWs existing in the time series data oriented neuron 902(t) at each acquisition time point t. During learning performed by the learning unit 361, initial values of the learning parameters RWs are randomly determined. The learning parameters RWs are updated every time the feature amount vector $x_{(t)}$ is input to the time series data oriented neuron 902(t) during learning performed by the learning unit 361. The learning parameters RWs are optimized by the following Formula (6).

The internal vector $h_{(t)} \in R^{D'}$ ($R^{D'}$ is a D'-dimensional actual number. D' is an integer of 1 or more) is information in which an internal state parameter $_{(t-1)} \in R^{D''}$ ($R^{D''}$ is a D''-dimensional actual number. D'' is an integer of 1 or more) at the acquisition time point (t-1) which is one acquisition time point before the acquisition time point t is reflected in the information specified by the feature amount vector $x_{(t)}$. However, an internal state parameter $c_{(0)}$ is a value initialized with zero or a random number. The internal vector $h_{(t)}$ is output to the transform unit group 903 in a subsequent stage.

On the other hand, the internal state parameter cm is output to a time series data oriented neuron 902(t+1) at a next acquisition time point (t+1). However, the time series data oriented neuron 902(T) does not output the internal state parameter $c_{(T)}$. The internal state parameter $c_{(t)}$ is a parameter (vector) in which the feature amounts of the factors F from the feature amount vector $x_{(1)}$ to the feature amount vector $x_{(t-1)}$ before the acquisition time point (t-1) which is one acquisition time point before the acquisition time point t are aggregated by the RNN function. The internal state parameter $c_{(t)}$ is a vector that cannot be understood by a human being, such as encrypted cache information.

For the calculation of the RNN function in the time series data oriented neuron $902(t)$, it is possible to use a calculation of a time series neural network capable of handling time series data, such as a long short-term memory (LSTM), a gate current unit (GRU), and a convolution network (CNN). It is also possible to adopt a configuration in which the time series neural networks are used in multiple layers. The type and the number of layers of the time series data oriented neuron $902(t)$ and the number of dimensions D' of the internal vector $h_{(t)}$ can be freely set by a user operation.

Further, at the time of prediction performed by the prediction unit 362, the time series data oriented neuron $902(t)$ can also be executed in the same manner as at the time of learning performed by the learning unit 361. Hereinafter, in order to distinguish information used at the time of prediction performed by the prediction unit 362 from that used at the time of learning performed by the learning unit 361, "'" is added, for example, as in the feature amount vector $x'_{(t)}$. However, the feature amount vector $x'_{(t)}$ which is the test data may be a feature amount vector the same as or different from the feature amount vector $x_{(t)}$ which is the training data. At the time of prediction performed by the prediction unit 362, the time series data oriented neurons $902(1)$ to $902(T)$ respectively receive input of the feature amount vectors $x'_{(1)}$ to $x''_{(T)}$ as the test data set 352.

Then, the time series data oriented neuron $902(t)$ calculates the internal vector $h'_{(t)}$ and the internal state parameter $c'_{(t)}$ according to the above Formula (1) by applying the feature amount vector $x'_{(t)}$, the internal state parameter $c'_{(t-1)}$, and the learning parameters RWs obtained at the time of learning performed by the learning unit 361 to the RNN function. The internal vector $h'_{(t)}$ is output to the transform unit group 903 in the subsequent stage.

The transform unit group 903 is a set of T transform units $903(1)$ to $903(T)$. At the time of learning performed by the learning unit 361, the transform unit $903(t)$ receives input of the internal vector $h_{(t)}$ and calculates a transform vector $v_{(t)}$ according to the following Formula (2). The transform vector $v_{(t)}$ is output to the reallocation unit 904 in the subsequent stage.

$$v_{(t)}^\alpha = W_\beta^\alpha h_{(t)}^\beta \quad (2)$$

In the above Formula (2), Einstein summation convention is used. For example, in $Z^\alpha = X^\alpha_\beta \cdot Y^\beta$, X is a matrix of $\alpha$ rows and $\beta$ columns, Y is a matrix of $\beta$ rows, and Z is a matrix (vector) of $\alpha$ rows and 1 column. Hereinafter, the Einstein summation convention is used in equations used to describe the calculation. In addition, $\alpha$ and $\beta$ may be omitted.

$W \in R^{D \times D'}$ ($R^{D \times D'}$ is a D×D'-dimensional actual number) is one of the learning parameters 365, and exists at each acquisition time point t. At the time of learning performed by the learning unit 361, an initial value of the learning parameter W is randomly determined. The learning parameter W is updated every time the internal vector $h_{(t)}$ is input to the transform unit $903(t)$ at the time of learning performed by the learning unit 361. The transform vector $v_{(t)}$ is a vector for converting a position of the feature amount vector $x_{(t)}$ existing in a feature amount space at the acquisition time point t into a position where the value of the objective variable Y is easy to be distinguished.

Further, at the time of prediction performed by the prediction unit 362, the transform unit $903(t)$ can also be executed in the same manner as at the time of learning performed by the learning unit 361. The transform units $903(1)$ to $903(T)$ respectively accept input of the internal vectors $h'_{(1)}$ to $h'_{(T)}$. Then, the transform unit $903(t)$ calculates a transform vector $v'_{(t)}$ by applying the internal vector $h'_{(t)}$ and a learning parameter W optimized by the following Formula (9) to the above Formula (5). The transform vector $v'_{(t)}$ is output to the reallocation unit 904 in the subsequent stage.

The reallocation unit 904 rearranges a feature amount vector group ($x_{(1)(1)}$ to $x_{(N)(T)}$), which is the training data set 364, in the feature amount space. To illustrate the calculation of the reallocation unit 904, a method of calculating a Hadamard product between two time series vectors $u_{(t=1, \ldots, T)}$ and $v_{(t=1, \ldots, T)}$ is defined by the following Formula (3).

$$\vec{u}_{(t=1,\ldots,T)} \odot \vec{v}_{(t=1,\ldots,T)} \equiv \left\{ \begin{bmatrix} u_{1,(1)} v_{1,(1)} \\ \vdots \\ u_{D,(1)} v_{D,(1)} \end{bmatrix}, \ldots, \begin{bmatrix} u_{1,(T)} v_{1,(T)} \\ \vdots \\ u_{D,(T)} v_{D,(T)} \end{bmatrix} \right\} \quad (3)$$

where $$\vec{u}_{(t=1,\ldots,T)} = \left\{ \begin{bmatrix} u_{1,(1)} \\ \vdots \\ u_{D,(1)} \end{bmatrix}, \ldots, \begin{bmatrix} u_{1,(T)} \\ \vdots \\ u_{D,(T)} \end{bmatrix} \right\} \text{ and}$$

$$\vec{v}_{(t=1,\ldots,T)} = \left\{ \begin{bmatrix} v_{1,(1)} \\ \vdots \\ v_{D,(1)} \end{bmatrix}, \ldots, \begin{bmatrix} v_{1,(T)} \\ \vdots \\ v_{D,(T)} \end{bmatrix} \right\}$$

provided that $\vec{u}_{(t=1, \ldots, T)}$ is a time series vector $u_{(t=1, \ldots, T)}$ $\vec{v}_{(t=1, \ldots, T)}$ is a time series vector $v_{(t=1, \ldots, T)}$ At the time of learning performed by the learning unit 361, the reallocation unit 904 receives the input of the feature amount vectors $x_{(1)t}$ to $x_{(T)}$ and the transform vectors $v_{(1)}$ to $v_{(T)}$, and calculates a reallocation vector $R \in R^D$ according to the following Formula (4). The reallocation vector R is output to the decision unit 905 and the importance unit 906 in the subsequent stage. $r_{(t)}$ on the right side is a reallocation vector at the acquisition time point t, and is a Hadamard product of the transform vector $v_{(t)}$ and the feature amount vector $x_{(t)}$. The reallocation vector R is an average value of reallocation vectors $r_{(1)}$ to $r_{(T)}$.

$$R^\alpha = \frac{1}{T-1} \sum_t v_{(t)}^\alpha \odot x_{(t)}^\alpha = \frac{1}{T-1} \sum_t r_{(t)}^\alpha \quad (4)$$

Further, at the time of prediction performed by the prediction unit 362, the reallocation unit 904 can also be executed in the same manner as at the time of learning performed by the learning unit 361. At the time of prediction performed by the prediction unit 362, the reallocation unit 904 receives the input of the feature amount vectors $x'_{(1)}$ to $x'_{(T)}$ and the transform vectors $v'_{(t)}$ to $v'_{(t)}$. Then, the reallocation unit 904 calculates a reallocation vector $R' \in R^D$ by applying the feature amount vectors $x'_{(1)}$ to $x'_{(T)}$ and the transform vector $v'_{(t)}$ to $v'_{(t)}$ to the above Formula (4). The reallocation vector R' is output to the decision unit 905 and the importance unit 906 in the subsequent stage.

The decision unit 905 calculates a prediction value $y_{(n)}$ corresponding to the objective variable $Y_{(n)}$ according to the following Formula (5) at the time of learning performed by the learning unit 361.

$$y = \sigma(w_\alpha R^\alpha) \quad (5)$$

In the above Formula (5), σ is a sigmoid function, w∈$R^D$ is a learning parameter, and the prediction value $y_{(n)}$ is a probability value of the objective variable $Y_{(n)}$ of being the support required 1. At the time of learning performed by the learning unit 361, an initial value of a learning parameter w is randomly determined. The learning parameter w is updated every time the reallocation vector R is input to the reallocation vector 904 at the time of learning performed by the learning unit 361. In a case of solving a task of identifying three or more classes such as the independence, the support required 1, and the support required 2 according to the present embodiment, a softmax function is applied instead of the sigmoid function σ.

The learning unit 361 applies the objective variable $Y_{(n)}$ and the prediction value $y_{(n)}$ to the following Formula (6) using a statistical gradient method, and calculates {RWs,W,w} which are the learning parameters 365 in order to minimize cross entropy thereof. Accordingly, {RWs,W,w} is optimized. The learning unit 361 stores the optimized {RWs,W,w} in the server DB 363. When the optimized {RWs,W,w} is applied to the neural network 900, the prediction model is obtained.

$$\mathrm{argmin}_{\{RWs,W,w\}} \Sigma_n -(Y_{(n)}\log(y_{(n)})+(1-Y_{(n)})\log(1-y_{(n)})) \quad (6)$$

The importance unit 906 calculates an importance degree vector ξ at the time of prediction performed by the prediction unit 362. To illustrate the calculation of the importance unit 906, a method of calculating a Hadamard product between the vector w and a vector $u_{(t=1,\ldots,T)}$ is defined by the following Formula (7).

$$\vec{w} \odot \vec{u}_{(t=1,\ldots,T)} \equiv \left\{ \begin{bmatrix} w_1 u_{1,(1)} \\ \vdots \\ w_D u_{D,(1)} \end{bmatrix}, \ldots, \begin{bmatrix} w_1 u_{1,(T)} \\ \vdots \\ w_D u_{D,(T)} \end{bmatrix} \right\} \text{ where} \quad (7)$$

$$\vec{w} = \begin{bmatrix} w_1 \\ \vdots \\ w_D \end{bmatrix} \text{ and}$$

$$\vec{u}_{(t=1,\ldots,T)} = \left\{ \begin{bmatrix} u_{1,(1)} \\ \vdots \\ u_{D,(1)} \end{bmatrix}, \ldots, \begin{bmatrix} u_{1,(T)} \\ \vdots \\ u_{D,(T)} \end{bmatrix} \right\}$$

provided that $\vec{w}_{(t=1,\ldots,T)}$ is a time series vector $w_{(t=1,\ldots,T)}$, $\vec{u}_{(t=1,\ldots,T)}$ is a time series vector $u_{(t=1,\ldots,T)}$ The importance unit 906 receives the input of the optimized learning parameter w and transform vector $v'_{(t)}$, and calculates an importance degree vector $\xi_{(t)}(x')$ of the feature amount vector x' according to the following Formula (8) reflecting the above Formula (7). Each element of the importance degree vector $\xi_{(t)}(x')$ represents an importance degree contributing to the prediction of the support required 1 in an n-th subject in the test data set 352 (feature amount vector $x'_{(1)}$ to $x'_{(T)}$) at a certain acquisition time point t. The prediction unit 362 stores the importance degree vector $\xi_{(t)}(x')$ in the client DB 351 as the prediction result 353. The prediction unit 362 performs logistic regression at each acquisition time point t according to the following Formula (8).

$$\xi_{\alpha,(t)}(\vec{x}') = w_\alpha \odot v'_{\alpha,(t)} \quad (8)$$

provided that $\vec{x}'_{(t)}$ is a feature amount vector $x'_{(t)}$

In the above Formula (8), the transform vector $v'_{(t)}$ is calculated by an inner product of the optimized learning parameter W and the internal vector $h'_{(t)}$ as in the above Formula (2). The internal vector $h'_{(t)}$ is obtained by applying the feature amount vector $x'_{(t)}$ and the internal state parameter $c_{(t-1)}$ one acquisition time point before the acquisition time point t to the RNN function to which the optimized learning parameters RWs are applied as in the above Formula (1).

That is, the feature amount vectors aggregated from the feature amount vectors $x'_{(0)}$ to $x'_{(t-1)}$ input to the time series data oriented neuron 902(t-1) before the acquisition time point (t-1) together with the feature amount vector $x'_{(t)}$ are recursively input to the RNN function to calculate the internal vector $h'_{(t)}$ and the internal state parameter $c'_{(t)}$.

At the time of prediction performed by the prediction unit 362, the decision unit 905 calculates an unknown prediction value $y'_{(n)}$ for the feature amount vector x' according to the following Formula (9) using the importance degree vector $\xi_{(t)}(x')$ obtained by the above Formula (8).

$$y'_{(n)} = \sigma\left( \frac{1}{T_n - 1} \sum_t \xi_{\alpha,(t)}(\vec{x}'_{(n)}) x'^{\alpha}_{(t,n)} \right) \quad (9)$$

The importance degree vector $\xi_{(t)}(x')$ calculated by the Hadamard product of the optimized learning parameter w and the transform vector $v'_{(t)}$ is used in the above Formula (9). Therefore, by applying the feature amount vectors $x'_{(1)}$ to $x'_{(T)}$, which are the test data set 352, to the above Formula (9), the decision unit 905 calculates the unknown prediction value $y'_{(n)}$ for the feature amount vectors $x'_{(1)}$ to $x'_{(T)}$ by the neural network 900 in which the optimized learning parameters 365 {RWs,W,w} are reflected.

In the above Formula (9), an importance degree vector $\xi_{(t)}(x'_{(n)})$ corresponds to a parameter of a local plane for identifying the feature amount vector $x'_{(n)(t)}$. For example, the analysis unit 701 stores, in the client DB 351 as the prediction result 353, the prediction value $y'_{(n)}$ in association with the importance degree vector $\xi(t)(x'_{(n)})$.

The analysis unit 701 calculates, according to the following Formulas (10) and (11), magnitude $\Gamma(x_1'_{(t)}, x_2'_{(t')})$ of the relevance degree between the feature amount vector $x_1'_{(t)}$ of the first factor 501 at the first time point 502 (time point t) and the feature amount vector $x_2'_{(t')}$ of the second factor 503 at the second time point 504 (time point t') by using the reallocation vector r obtained by rearranging the feature amount vector group in the feature amount space.

$$\Gamma(x_{1,(t)}, x_{2,(t')}) = \rho(r_{1,(t)}, r_{2,(t')}) \quad (10)$$

$$\Gamma(x_{1,(t)}, x_{2,(t')}) = \rho(v_{1,(t)} \odot x_{1,(t)}, v_{2,(t')} \odot x_{2,(t')}) \quad (11)$$

Right sides of the above Formulas (10) and (11) represent a sample correlation coefficient of a data column in parentheses. A reallocation vector $r_{1,(t)}$ on the right side corresponds to the feature amount vector $x_1'_{(t)}$ of the first factor 501 at the first time point 502 (time point t). A reallocation vector $r_{2,(t')}$ corresponds to the feature amount vector $x_2'_{(t')}$ of the second factor 503 at the second time point 504 (time point t').

Next, setting of the connection type performed by the analysis unit 701 will be described. The connection type is represented by a set {$x_1'_{(t)}$, $x_2'_{(t')}$} of the feature amount vector $x_1'_{(t)}$ of the first factor 501 at the first time point 502 (time point t) and the feature amount vector $x_2'_{(t')}$ of the second factor 503 at the second time point 504 (time point t') in the time series data 400 as the test data set 352.

Instead of the connection type $\{x_{1(t)}', x_{2(t')}'\}$, a set of reallocation vectors $\{r_{1(t)}', r_{2(t')}'\}$ may be used, or a set of weighted reallocation vectors $\{w_1 r_{1(t)}', w_2 r_{2(t')}'\}$ or a set of feature amount vectors weighted by the importance degree vector (see the following Formula (12)) may be used.

$$(\xi_{1(t)} \odot x_{1(t)}, \xi_{2(t')} \odot x_{2(t')}) \quad (12)$$

By using the set of the reallocation vectors $\{r_{1(t)}', r_{2(t')}'\}$, a prediction result can be obtained by applying the property of the time series data considered by the prediction model (what the prediction model desires to represent). Further, by using the set of weighted reallocation vectors $\{w_1 r_{1(t)}', w_2 r_{2(t')}'\}$ or the set of feature amount vectors weighted by the importance degree vector (see the above Formula (12)), a prediction result can be obtained by emphasizing the property of the time series data considered by the prediction model.

Next, in FIG. 8, the generation device 320 converts, by the structure data generation unit 702, the relevance degree and the connection type $\{x_{1(t)}', x_{2(t')}'\}$ into the first structure data and the second structure data, respectively (step S803). Specifically, for example, the structure data generation unit 702 converts the magnitude $\Gamma(x_{1(t)}', x_{2(t')}')$ of the relevance degree in the above Formula (10) into the first structure data of one matrix of (T×D) rows and (T×D) columns.

Each row of the first structure data represents the feature amount of each factor F at each time point t, and each column also represents the feature amount of each factor F at each time point t. Each element of the matrix of the first structure data stores a value of the relevance degree between the feature amount of the factor F at the time point t in the corresponding row and the feature amount of the factor F at the time point t in the corresponding column.

The structure data generation unit 702 converts the connection type $\{x_{1(t)}', x_{2(t')}'\}$ into second structure data groups of $_{T \times D}C_2$ matrixes each including N rows and two columns. Each row of each piece of the second structure data of the second structure data group represents each sample. The two columns are feature amounts of factors Fa and Fb (the first feature amount 611 and the second feature amount 612) at a certain time point t, respectively.

In the elements of the matrix of the second structure data, the feature amount of the factor F at the time point t of the corresponding column included in the sample of the corresponding row is stored. All combinations of the first feature amount 611 and the second feature amount 612 selected from the feature amounts of all the factors at all the time points t=1, . . . , T of the second structure data are the second structure data group.

The generation device 320 stores the first structure data and the second structure data group in the storage device. The generation device 320 may display the first structure data and the second structure data group on the monitor 325 or may transmit the first structure data and the second structure data group to the client terminal 300 via the network 310 in a displayable manner.

Next, the generation device 320 generates, by the visualization element generation unit 703, a first visualization element and a second visualization element based on the first structure data and the second structure data (step S804). As shown in FIG. 1, the visualization element generation unit 703 generates, for each element of the matrix of the first structure data, a box-shaped visualization element representing the factor F at the time point t corresponding to the row of the element and the factor F at the time point t corresponding to the column of the element, and generates a black line indicating the magnitude of the relevance degree between the factors F as a process graph visualization element.

Based on each piece of second structure data of the second structure data group, the visualization element generation unit 703 generates, for two feature amounts (the first feature amount 611 and the second feature amount 612) constituting the column of each piece of second structure data, two vertical axes A representing a value range of a connection type $\{x_{1(t)}', x_{2(t')}'\}$ that characterizes two feature amounts, and a line segment group (the line segments 201, 202, 203, and the like) representing the connection type $\{x_{1(t)}, x_{2(t')}\}$ of the two feature amounts, as line graph visualization elements. At this time, the visualization element generation unit 703 generates, for all samples, a line segment indicating one connection type for each sample. Points on the two vertical axes A of the values of the connection type $\{x_{1(t)}', x_{2(t')}'\}$ of the corresponding sample are set as both ends of the line segment.

Next, the generation device 320 generates the process graph 100 by the graph generation unit 704 using the process graph visualization element generated in step S804, and generates the line graph 200 using the line graph visualization element generated in step S804 (step S805).

By generating the process graph 100, it is possible to visualize which factor F is related to which factor F among all of the factors F or a part of the factors F, which leads to the care requirement. The user can grasp various scenarios leading to care requirement by viewing the process graph 100.

As shown in FIG. 2, the line graph 200 includes the vertical axis A indicating the feature amounts (the first feature amount 611 and the second feature amount 612) of the factors Fa and Fb at each time point t and the value range thereof, and the line segment group indicating the connection type between the factors F at each time point t. In the generation of the line graph 200, instead of changing a gray scale of the line segment group, the gray scale, the color, the thickness, or the shape of the line segment group may be changed based on other factors, an objective variable, or a reference.

In this manner, by generating the line graph 200, it is possible to visualize which feature amount is traced by each factor F in a certain scenario SC including a series of factors F, which leads to care requirement or not. The generation device 320 stores the process graph 100 and the line graph 200 in the storage device. Further, the generation device 320 may display the process graph 100 and the line graph 200 on the monitor 325, or may transmit the process graph 100 and the line graph 200 to the client terminal 300 via the network 310 in a displayable manner.

In the first embodiment, the prediction model of the neural network 900 is applied, but when the reallocation vector $r_{(n)(t)}$ is not used, the prediction model may be a prediction model obtained by a neural network capable of handling the time series data 400 such as LSTM, GRU, and CNN. In this case, the magnitude of the relevance degree between the feature amount vector $x_{1(t)}'$ of the first factor 501 at the first time point 502 (time point t) and the feature amount vector $x_{2(t')}'$ of the second factor 503 at the second time point 504 (time point t') may be a correlation coefficient between the feature amount vector $x_{1(t)}'$ of the first factor 501 and the feature amount vector $x_{2(t')}'$ of the second factor 503.

As described above, according to the first embodiment, it is possible to generate the process graph 100 and the line graph 200 representing the scenario SC that reaches the future predicted while handling the feature amount of the factor F as a continuous value. Instead of using the vertical axes A1 to A3 and AC labeled with continuous values, the generation device 320 may generate the line graph 200 using a vertical axis labeled with discretized numerical values.

Figure 10:
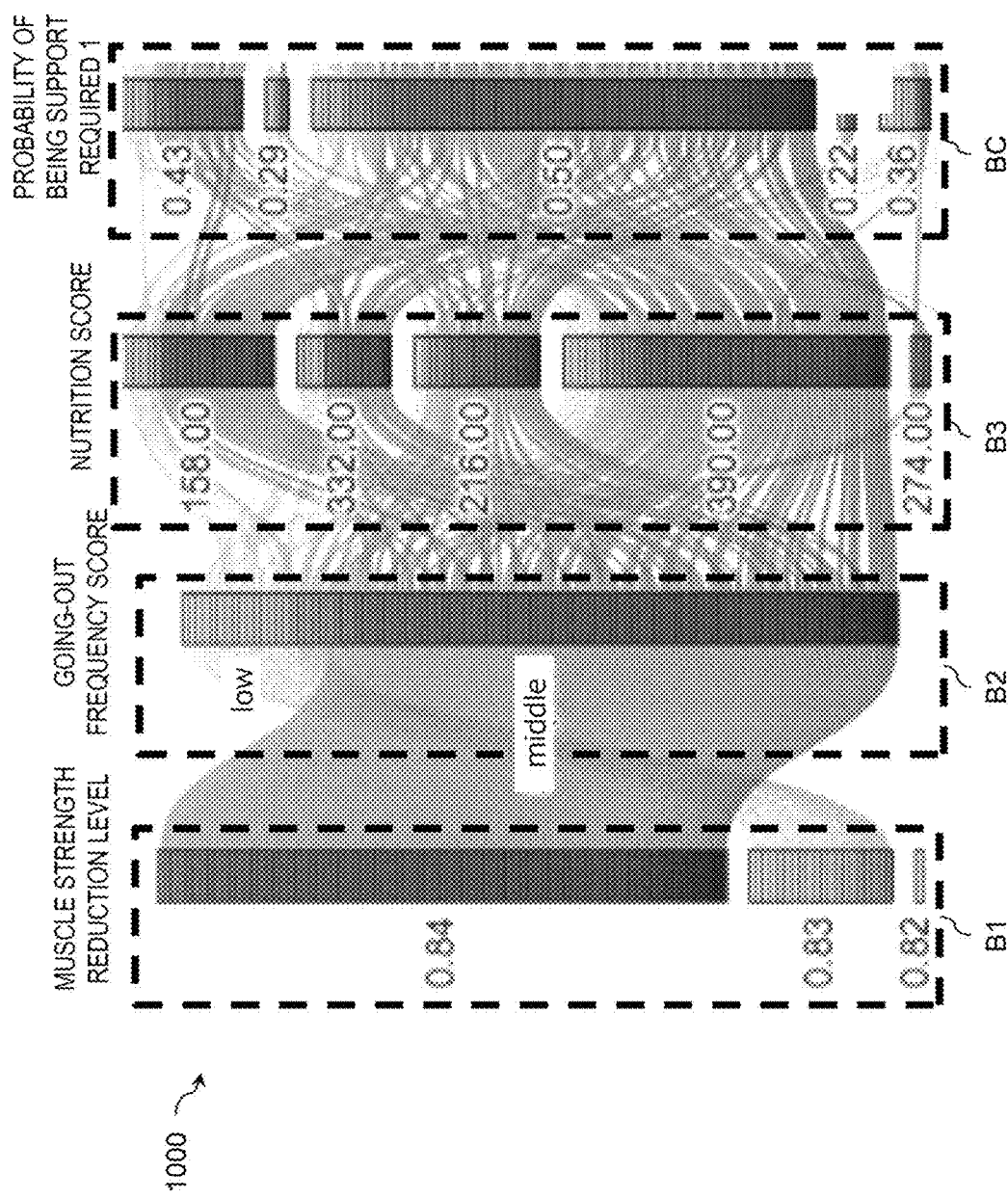
FIG. 10 is an explanatory diagram showing another example of the line graph.

FIG. 10 is an explanatory diagram showing another example of the line graph. Vertical axes B1 to B3 and BC of the line graph 200 in FIG. 10 are labeled with discrete numerical values. For example, when the vertical axis B1 is taken as an example, the muscle strength reduction level is labeled with numerical values 0.84, 0.83, and 0.82. That is, in a range (value range) of the vertical axes B1 to B3 and BC, values of the lowest digits of the feature amount are discontinuous. Each range (length in a vertical axis B1 direction) of 0.84, 0.83, 0.82 is proportional to the number of line segments which include the labeled numerical value 0.84, 0.83, 0.82 in the connection type. Therefore, the user can intuitively grasp which numerical value has more connection types, that is, more line segments than other numerical values.

When two factors (referred to as factors Fc and Fd) at time points t (for example, t1 and t3) that are not adjacent to each other are connected by a predetermined number (for example, five) of factors or more and links L each having a relevance degree equal to or greater than a threshold value (for example, 0.2) between the time points t1 to t3, the generation device 320 may delete the visualization elements of the predetermined number or more of the factors F and the visualization elements having the relevance degree equal to or less than the threshold value, and may directly connect the factors Fc and Fd with new visualization elements.

FIG. 11 is an explanatory diagram showing an example of shortening the process graph. For example, in a scenario SC5A before shortening in FIG. 11, it is assumed that the "muscle strength reduction" of the factor F1 at the time point t1 and the "low-nutrition" of the factor F3 at the time point t3 are connected to eight factors F2, F5, F8, and F12 to F17 at the time point t2 by links L12, L15, L18, L112, L117, L23, L53, L83, L123, and L173 each having a relevance degree value of 0.1.

At this time, the generation device 320 generates, by the visualization element generation unit 703, the factor F1 at the time point t1 and the factor F3 at the time point t3 and a thick line link L13 indicating a relevance degree value 0.8 (=0.1×8) equal to or greater than the threshold value. The generation device 320 deletes the graphic data of F2, F5, F8, and F12 to F17 and the links L12, L15, L18, L112, L117, L23, L53, L83, L123, and L173 by the graph generation unit 704, and connects the graphic data of the factor F1 and the graphic data of the factor F3 by the link L13.

Accordingly, a shortened scenario SC5B is generated. In this way, by shortening the scenario SC5A to the scenario SC5B, the process graph 100 can be simplified, and visibility for the user can be improved. The user can recognize the relevance degrees (each 0.1) with the eight omitted factors F2, F5, F8, and F12 to F17 as a whole by the thickness of the link L13 obtained by integrating L12, L15, L18, L112, L117, L23, L53, L83, L123, and L173 and the value 0.8 of the relevance degree.

The generation device 320 may directly generate the process graph 100 including the scenario SC5B after the shortening and display the process graph 100 on the monitor 325, or may generate the process graph 100 including the scenario SC5A before the shortening and display the process graph 100 on the monitors 305 and 325, and then update the process graph 100 to the process graph 100 including the scenario SC5B after the shortening and display the process graph 100 on the monitors 305 and 325, for example, by the user operation.

Second Embodiment

The generation device 320 according to a second embodiment creates a prediction model for predicting whether a cancer patient can survive for six months or more as a result of the clinical trial in the clinical trial of anticancer agents, and generates the process graph 100 and the line graph 200 representing a scenario leading to the prediction based on the prediction model. The process graph 100 and the line graph 200 make it possible for a pharmaceutical company that sells the anticancer agents to appropriately set an application method thereof, and become a great clue for elucidating an action mechanism of the anticancer agents. This contributes to the improvement of the quality of medical care and greatly contributes to the progress of pharmacy and medicine.

In the case of the second embodiment, $n=\{1, \ldots, N\}$ of the time series data 400 is an index for specifying a feature amount vector $x_{(n)(t)}$ of a certain patient. $t=\{1, \ldots, T\}$ is an index in which a date when a daily medical inquiry or an examination is performed is set as a time point. A feature amount vector $x_{(n)(t)} \in R^D$ is a D-dimensional actual numerical vector ($D \geq 1$), and includes information such as results of the daily medical inquiry and the examination. An objective variable $Y_{(n)}$ takes a class value of either 0 or 1. In the second embodiment, $Y_{(n)}=1$ means that the result of the clinical trial is that the patient can survive for 6 months or more. $Y_{(n)}=0$ means that the result of the clinical trial is that the patient cannot survive for 6 months or more.

When a graph generation processing procedure similar to that of the first embodiment is executed, the generation device 320 according to the second embodiment can generate the process graph 100 capable of visualizing which medical inquiry or examination result leads to survival or death in which order in daily medical inquiry or examination, and the line graph 200 make it possible to grasp which medical inquiry result or examination value affects survival or death among the scenarios SC shown in the process graph 100.

Third Embodiment

The generation device 320 according to a third embodiment will be described by taking, as an example, a device that creates a prediction model for predicting whether a value of a financial product suddenly drops within one year based on market data, and generates the process graph 100 and the line graph 200 representing a scenario leading to prediction based on the prediction model. The process graph 100 and the line graph 200 can make it possible to understand what kind of flow occurs in the entire market when the value of the financial product suddenly drops, and help to avoid a risk of investment in dangerous financial products. Visualization of the flow of market movement made up of a huge amount of data in an understandable form greatly contributes to the progress of economics.

In the case of the third embodiment, $n=\{1, \ldots, N\}$ of the time series data 400 is an index for specifying a feature amount vector $x_{(n)(t)}$ of a certain financial product. $t=\{1, \ldots, N\}$ is an index in which a transaction date and time is set as a time point. The feature amount vector $x_{(n)(t)} \in R^D$ is a D-dimensional actual numerical vector ($D \geq 1$), and includes accounting information of a company related to the financial product and information of the entire market. An objective variable $Y_{(n)}$ takes a class value of either 0 or 1. In the third embodiment, $Y_{(n)}=1$ means that the value rapidly drops within one year, and $Y_{(n)}=0$ means that the value does not rapidly drop within one year.

When a graph generation processing procedure similar to that of the first embodiment is executed, the generation device 320 according to the third embodiment can generate the process graph 100 capable of visualizing which element leads to a sudden drop in the value of the financial product in which order in the accounting information or the market information, and the line graph 200 make it possible to specifically grasp which a value on which account or a numerical value on the market affects the value of the financial product in the scenario SC shown in the process graph 100.

In the first to third embodiments described above, the analysis unit 701 generates the prediction model, but the prediction model may be implemented in advance.

The generation device 320 according to the first to third embodiments described above may also be constituted as in the following (1) to (9).

(1) In the generation device 320 including the processor 323 that executes a program and the storage device that stores the program, the processor 323 executes visualization element generation processing of generating, based on the time series data 400 including feature amounts of a plurality of different factors F existing in time series, a feature amount range visualization element (vertical axes A1 to A3) that defines a feature amount range that is a continuous range of the feature amount for each of the factors F, and generating an inter-feature amount visualization element (line segments 201 and 202) that defines relevance between a first feature amount of a first factor Fa and a second feature amount of a second factor Fb that are continuous in time among the plurality of different factors F, and executes graph generation processing of generating the line graph 200 indicating a relationship of the feature amounts related to the plurality of different factors F by associating, by the inter-feature amount visualization element (line segments 201 and 202), a first feature amount range visualization element (vertical axis Aa) of the first factor Fa and a second feature amount range visualization element (vertical axis Aa) of the second factor Fb among the feature amount range visualization element for each of the factors F generated by the visualization element generation processing.

That is, in the analysis of the time series data 400, the generation device 320 generates the line graph 200 representing the scenario SC that leads to a predicted future while maintaining continuity of the feature amounts of the factors F. Accordingly, the relationship of the factors F at different time points can be presented using continuous feature amounts. Therefore, it is possible to visualize which feature amount the time series factor group follows.

(2) In the generation device 320 of the above (1), in the visualization element generation processing, the processor 323 generates, based on the time series data 400 and a prediction value (probability of being the support required 1) of a result related to the plurality of different factors, a prediction value range visualization element (vertical axis AC) that defines a prediction value range that is a continuous range of the prediction value, and generates an inter-feature amount prediction value visualization element (line segment 203) that defines relevance between a third feature amount of a third factor Fc that appears after the second factor Fb among the plurality of different factors F and the prediction value (probability of being the support required 1) of the result. In the graph generation processing, the processor 323 generates the line graph 200 by further associating, by the inter-feature amount prediction value visualization element (line segment 203), the third feature amount range visualization element (vertical axis A3) of the third factor Fc and the prediction value range visualization element (vertical axis AC).

Accordingly, the relationship between the factors F and the result at different time points can be presented using continuous feature amounts. Therefore, it is possible to visualize which prediction result the time series factor group obtains when following which feature amount.

(3) In the generation device 320 described in the above (1), in the visualization element generation processing, the processor 323 generates, based on the time series data 400, a feature amount range visualization element (vertical axes A1 to A3) that defines, for each of the factors, a feature amount range indicating a continuous value of a feature amount for each of the factors F.

Accordingly, the feature amount range indicating the relationship of the factors F at different time points can be presented as a continuous value. Therefore, it is possible to visualize which feature amount the time series factor group follows.

(4) In the generation device 320 described in the above (1), in the visualization element generation processing, the processor 323 generates, based on the time series data 400, a feature amount range visualization element (vertical axes A1 to A3) that defines, for each of the factors F, a range of each of a plurality of values of the feature amount for each of the factors F in accordance with the number of inter-feature amount visualization elements (line segments 201 and 202) including the value.

Accordingly, it is possible to present the feature amount indicating the relationship among the factors F at different time points as discrete values having certain continuity. Therefore, it is possible to visualize how many samples follow which factor of which feature amount.

(5) In the generation device 320 described in the above (1), in the visualization element generation processing, when a scenario SC in which the plurality of different factors F are arranged in time series is selected, the processor 323 generates, based on the time series data 400 including feature amounts of the plurality of different factors F in the scenario SC, a feature amount range visualization element (vertical axes A1 to A3), and generates inter-feature amount visualization element (line segments 201 and 202).

Accordingly, the relationship between the series of factors F constituting the scenario SC can be presented using continuous feature amounts. Therefore, it is possible to visualize which feature amount the scenario SC follows.

(6) In the generation device 320 described in the above (2), the processor 323 executes analysis processing of outputting, as a prediction value, a probability of being a specific result (support required 1) as a result of inputting the time series data 400 to a prediction model configured to predict that the result related to the plurality of different factors F is the specific result (support required 1). In the visualization element generation process, the processor 323 generates the inter-feature amount prediction value visualization element (line segment 203) based on the time series data 400 and the prediction value output by the analysis processing.

Accordingly, the relationship between a series of time series factors F and the prediction value can be specified with high accuracy.

(7) In the generation device 320 described in the above (1), in the visualization element generation processing, the processor 323 generates a factor visualization element (graphic data of the factor F) that defines each of the plurality of different factors F and a first relevance degree visualization element (link Lab, L12 if the first factor Fa is F1 and the second factor Fb is F2) that defines a first relevance degree between the first factor Fa and the second factor Fb. In the graph generation processing, the processor 323 generates the process graph 100 indicating the process of the plurality of different factors F by connecting a first factor visualization element (graphic data of the factor Fa) that defines the first factor Fa and a second factor visualization element (graphic data of the factor Fb) that defines the second factor Fb by the first relevance degree visualization element (the link Lab).

Accordingly, it is possible to visualize the scenario SC indicating which factor F follows in which order.

(8) In the generation device 320 described in the above (7), the processor 323 executes analysis processing of outputting, as a prediction value, a probability of being a specific result (support required 1) as a result of inputting the time series data 400 into a prediction model configured to predict that the result related to the plurality of different factors F is the specific result (support required 1), and outputting an importance degree for illustrating the prediction value. In the visualization element generation processing, the processor 323 generates the first relevance degree visualization element (link Lab) based on a first importance degree (referred to as an importance degree vector $\xi_a$) of the first factor Fa and a second importance degree (referred to as an importance degree vector $\xi_b$) of the second factor Fb output by the analysis processing.

Accordingly, it is possible to obtain the relevance degree in consideration of the importance degree $\xi$ of the factor F.

(9) In the generation device 320 described in the above (7), in the visualization element generation processing, when the first relevance degree of the first relevance degree visualization element (link Lab) and the second relevance degree of the second relevance degree visualization element (referred to as Lbd, a link L23 if the second factor Fb is F2 and a fourth factor Fd is F3) connecting the second factor visualization element (graphic data of the factor Fb) and a fourth factor visualization element (graphic data of the factor Fd) defining a fourth factor (Fd) appearing at a next time point of the second factor Fb are both equal to or less than a threshold value, the processor 323 generates, based on the first relevance degree and the second relevance degree, a third relevance degree visualization element (referred to as Lad, a link L13 when the first factor Fa is F1 and the fourth factor Fd is F3) connecting the first factor visualization element (graphic data of the factor Fa) and the fourth factor visualization element (graphic data of the factor Fd). In the graph generation processing, the processor 323 generates the process graph 100 by connecting the first factor visualization element (graphic data of the factor Fa) and the fourth factor visualization element (graphic data of the factor Fd) by the third relevance visualization element (link Lad).

Accordingly, the process graph 100 can be simplified, and the visibility for the user can be improved.

The invention is not limited to the above-described embodiments and includes various modifications and equivalent configurations within the spirit of the claims. For example, the embodiments described above have been described in detail for easy understanding of the invention, and the invention is not necessarily limited to those having all the configurations described above. A part of a configuration of a certain embodiment may be replaced with a configuration of another embodiment. A configuration of another embodiment may be added to a configuration of the certain embodiment. Further, another configuration may be added to, subtracted by or replaced with a part of a configuration of each embodiment.

Further, a part or all of the configurations, functions, processing units, processing methods described above and the like may be implemented by hardware, for example by designing in an integrated circuit, or may be implemented by software, with the processor 323 to interpret and execute a program that implements each function.

Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and information lines according to the embodiments described above indicate what is considered necessary for description, and not all the control lines and the information lines are necessarily shown in a product. In practice, it may be considered that almost all the configurations are connected with one another.

What is claimed is:
1. A generation device comprising:
a processor configured to execute a program; and
a storage device that stores the program,
wherein the processor is configured to execute:
visualization element generation processing of generating, based on time series data including feature amounts of a plurality of different factors existing in time series, a feature amount range visualization element that defines a feature amount range, along a vertical axis, that is a continuous range of the feature amount for each of the factors, and
generating an inter-feature amount visualization element that defines a relevance between a first feature amount of a first factor and a second feature amount of a second factor that are continuous in time among the plurality of different factors, the first factor and the second factor being different factors used to generate a prediction value of a result, and
visualization information generation processing of generating visualization information indicating a relationship of the feature amounts related to the plurality of different factors by associating, by using the inter-feature amount visualization element, a first feature amount range visualization element of the first factor defined along a first vertical axis with a second feature amount range visualization element of the second factor defined along a second vertical axis among the feature amount range visualization element for each of the factors generated by the visualization element generation processing,
wherein the first vertical axis and the second vertical axis are displayed in chronological order based on the time series and the inter-feature amount visualization element is displayed as a line segment with one end indicating a first value of the first feature amount along the first vertical axis and another end indicating a second value of the second feature amount,
wherein the processor is configured to execute analysis processing of generating the prediction value, which is a probability of being a specific result based on inputting the time series data into a prediction model configured to predict that the result related to the plurality of different factors including the first factor and the second factor is the specific result, wherein the prediction model is generated by deep learning based on time series data, that includes respective feature amount vectors indicating feature amounts for the plurality of factors, and the feature amount vectors are input to the generated prediction model as test data, wherein in the visualization element generation processing, the processor is configured to generate a factor visualization element that defines each of the plurality of different factors and a first relevance degree visualization element that defines a first relevance degree between the first factor and the second factor, and wherein, in the analysis processing, the processor is configured to output an importance degree for illustrating the prediction value, and wherein, in the visualization element generation processing, the processor is configured to generate the first relevance degree visualization element based on a first importance degree of the first factor and a second importance degree of the second factor output by the analysis processing.

2. The generation device according to claim 1, wherein in the visualization element generation processing, the processor is configured to generate, based on the time series data and prediction values of results related to the plurality of different factors, a prediction value range visualization element that defines a prediction value range that is a continuous range of the prediction value, and generate an inter-feature amount prediction value visualization element that defines relevance between a third feature amount of a third factor that appears after the second factor among the plurality of different factors and the prediction value of the result, and wherein in the visualization information generation processing, the processor is configured to generate the visualization information by further associating, by the inter-feature amount prediction value visualization element, a third feature amount range visualization element and the prediction value range visualization element of the third factor.

3. The generation device according to claim 1, wherein the feature amount range visualization element defines, for each of the factors, a feature amount range indicating a continuous value of a feature amount for each of the factors.

4. The generation device according to claim 1, wherein the feature amount range visualization element that defines, for each of the factors, a range of each of a plurality of values of the feature amount for each of the factors, in accordance with the number of feature amount visualization elements including the value.

5. The generation device according to claim 1, wherein in the visualization element generation processing, a scenario in which the plurality of different factors are arranged in time series is selected, and wherein the processor is configured to generate the feature amount range visualization element based on time series data including feature amounts of the plurality of different factors in the scenario, and generate the inter-feature amount visualization element.

6. The generation device according to claim 2, wherein in the visualization element generation processing, the processor is configured to generate the inter-feature amount prediction value visualization element based on the time series data and the prediction value output by the analysis processing.

7. The generation device according to claim 1, wherein in the visualization information generation processing, the processor is configured to generate process visualization information indicating a process of the plurality of different factors by connecting a first factor visualization element defining the first factor and a second factor visualization element defining the second factor by the first relevance degree visualization element.

8. The generation device according to claim 7, wherein in the visualization element generation processing, the first relevance degree of the first relevance degree visualization element and the second relevance degree of the second relevance degree visualization element connecting the second factor visualization element and a fourth factor visualization element defining a fourth factor appearing at a next time point of the second factor are both equal to or less than a threshold value, wherein the processor is configured to generate, based on the first relevance degree and the second relevance degree, a third relevance degree visualization element connecting the first factor visualization element and the fourth factor visualization element, and wherein in the visualization information generation processing, the processor is configured to generate the process visualization information by connecting the first factor visualization element and the fourth factor visualization element by the third relevance degree visualization element.

9. A generation method executed by a generation device including a processor configured to execute a program and a storage device that stores the program, the generation method comprising:

executing by the processor:

visualization element generation processing of generating, based on time series data including feature amounts of a plurality of different factors existing in time series, a feature amount range visualization element that defines a feature amount range, along a vertical axis, that is a continuous range of the feature amount for each of the factors;

generating an inter-feature amount visualization element that defines relevance between a first feature amount of a first factor and a second feature amount of a second factor that are continuous in time among the plurality of different factors, the first factor and the second factor being different factors used to generate a prediction value of a result; and visualization information generation processing of generating visualization information indicating a relationship of the feature amounts related to the plurality of different factors by associating, by using the inter-feature amount visualization element, a first feature amount range visualization element of the first factor defined along a first vertical axis with a second feature amount range visualization element of the second factor defined along a second vertical axis among the feature amount range visualization element for each of the factors generated by the visualization element generation processing, wherein the first vertical axis and the second vertical axis are displayed in chronological order based on the time series and the inter-feature amount visualization element is displayed as a line segment with one end indicating a first value of the first feature amount along the first vertical axis and another end indicating a second value of the second feature amount, wherein the processor is configured to execute analysis processing of generating the prediction value, which is a probability of being a specific result based on inputting the time series data into a prediction model configured to predict that the result related to the plurality of different factors including the first factor and the second factor is the specific result, wherein the prediction model is generated by deep learning based on time series data, that includes respective feature amount vectors indicating feature amounts for the plurality of factors, and the feature amount vectors are input to the generated prediction model as test data, wherein in the visualization element generation processing, the processor is configured to generate a factor visualization element that defines each of the plurality of different factors and a first relevance degree visualization element that defines a first relevance degree between the first factor and the second factor, and wherein, in the analysis processing, the processor is configured to output an importance degree for illustrating the prediction value, and wherein, in the visualization element generation processing, the processor is configured to generate the first relevance degree visualization element based on a first importance degree of the first factor and a second importance degree of the second factor output by the analysis processing.

10. A recording medium storing a generation program causing a processor to execute steps comprising:

visualization element generation processing of generating, based on time series data including feature amounts of a plurality of different factors existing in time series, a feature amount range visualization element that defines a feature amount range, along a vertical axis, that is a continuous range of the feature amount for each of the factors; and generating an inter-feature amount visualization element that defines relevance between a first feature amount of a first factor and a second feature amount of a second factor that are continuous in time among the plurality of different factors, the first factor and the second factor being different factors used to generate a prediction value of a result, and visualization information generation processing of generating visualization information indicating a relationship of the feature amounts related to the plurality of different factors by associating, by using the inter-feature amount visualization element, a first feature amount range visualization element of the first factor defined along a first vertical axis with a second feature amount range visualization element of the second factor defined along a second vertical axis among the feature amount range visualization element for each of the factors generated by the visualization element generation processing, wherein the first vertical axis and the second vertical axis are displayed in chronological order based on the time series and the inter-feature amount visualization element is displayed as a line segment with one end indicating a first value of the first feature amount along the first vertical axis and another end indicating a second value of the second feature amount, wherein the processor is configured to execute analysis processing of generating the prediction value, which is a probability of being a specific result based on inputting the time series data into a prediction model configured to predict that the result related to the plurality of different factors including the first factor and the second factor is the specific result, wherein the prediction model is generated by deep learning based on time series data, that includes respective feature amount vectors indicating feature amounts for the plurality of factors, and the feature amount vectors are input to the generated prediction model as test data, wherein in the visualization element generation processing, the processor is configured to generate a factor visualization element that defines each of the plurality of different factors and a first relevance degree visualization element that defines a first relevance degree between the first factor and the second factor, and wherein, in the analysis processing, the processor is configured to output an importance degree for illustrating the prediction value, and wherein, in the visualization element generation processing, the processor is configured to generate the first relevance degree visualization element based on a first importance degree of the first factor and a second importance degree of the second factor output by the analysis processing.

* * * * *